(12) United States Patent
Rostami

(10) Patent No.: US 9,325,204 B2
(45) Date of Patent: Apr. 26, 2016

(54) APPARATUS AND METHOD FOR COMMUNICATING DATA AND POWER WITH ELECTRONIC DEVICES

(71) Applicant: Ramin Rostami, Calabasas, CA (US)

(72) Inventor: Ramin Rostami, Calabasas, CA (US)

(73) Assignee: Advanced Wireless Innovations LLC, Santa Monica, CA (US)

( * ) Notice: Subject to any disclaimer, the term of this patent is extended or adjusted under 35 U.S.C. 154(b) by 126 days.

(21) Appl. No.: 14/306,233

(22) Filed: Jun. 17, 2014

(65) Prior Publication Data

US 2014/0306538 A1    Oct. 16, 2014

Related U.S. Application Data

(63) Continuation of application No. 13/348,592, filed on Jan. 11, 2012, now Pat. No. 8,766,476, which is a continuation-in-part of application No. 12/572,276, filed on Oct. 2, 2009, now Pat. No. 8,487,476.

(60) Provisional application No. 61/453,114, filed on Mar. 15, 2011, provisional application No. 61/158,735, filed on Mar. 9, 2009.

(51) Int. Cl.
| | | |
|---|---|---|
| *H02J 3/00* | (2006.01) | |
| *H02J 4/00* | (2006.01) | |
| *H02J 7/02* | (2006.01) | |
| *H02J 9/06* | (2006.01) | |
| *G06F 1/26* | (2006.01) | |
| *H01M 10/46* | (2006.01) | |
| *H01M 10/42* | (2006.01) | |
| *H02J 7/00* | (2006.01) | |
| *H02J 7/34* | (2006.01) | |

(52) U.S. Cl.
CPC ............... *H02J 9/061* (2013.01); *G06F 1/263* (2013.01); *G06F 1/266* (2013.01); *H01M 10/425* (2013.01); *H01M 10/46* (2013.01); *H02J 3/00* (2013.01); *H02J 4/00* (2013.01); *H02J 7/00* (2013.01); *H02J 7/02* (2013.01); *H02J 7/0044* (2013.01); *H02J 7/0054* (2013.01); *H02J 7/345* (2013.01); *Y10T 307/344* (2015.04); *Y10T 307/658* (2015.04)

(58) Field of Classification Search
CPC ............... H02J 3/00; H02J 4/00; H02J 7/00; H02J 7/02; H02J 7/0044; H02J 7/0054; H02J 7/345; H02J 9/061; G06F 1/263; G06F 1/266; H01M 10/425; H01M 10/46; Y10T 307/344; Y10T 307/658
USPC .......................................................... 307/72
See application file for complete search history.

(56) References Cited

U.S. PATENT DOCUMENTS 6,483,204 B2 * 11/2002 Hanaki ..................... G06F 1/26
307/150

\* cited by examiner

*Primary Examiner* — Hal Kaplan
(74) *Attorney, Agent, or Firm* — Mintz Levin Cohn Ferris Glovsky and Popeo, P.C.

(57) ABSTRACT

A system, topology, and methods for providing power or data to electronic devices are described generally herein. Other embodiments may be described and claimed. The system may include an internal power source, charging module, modem, and an external power coupling module.

20 Claims, 25 Drawing Sheets

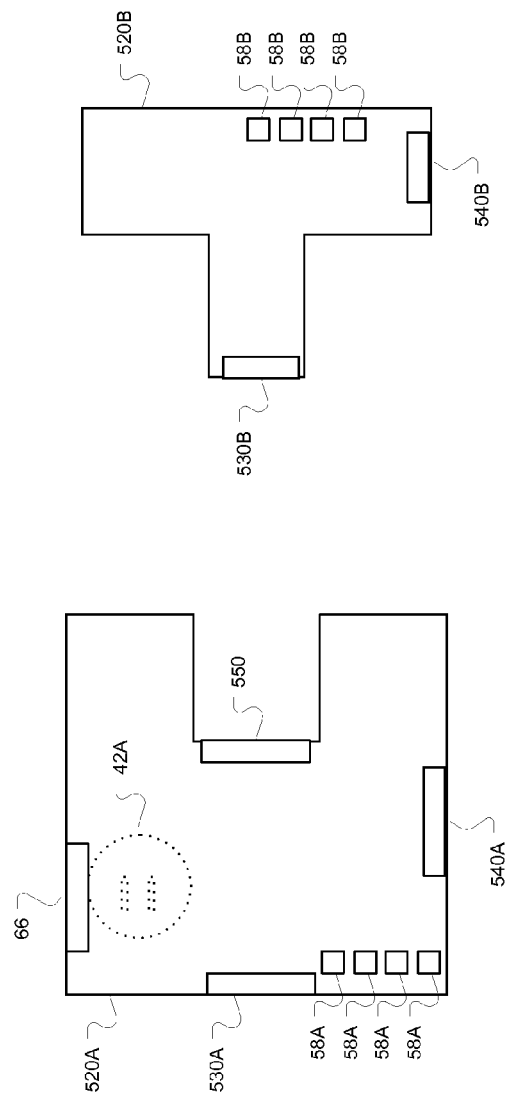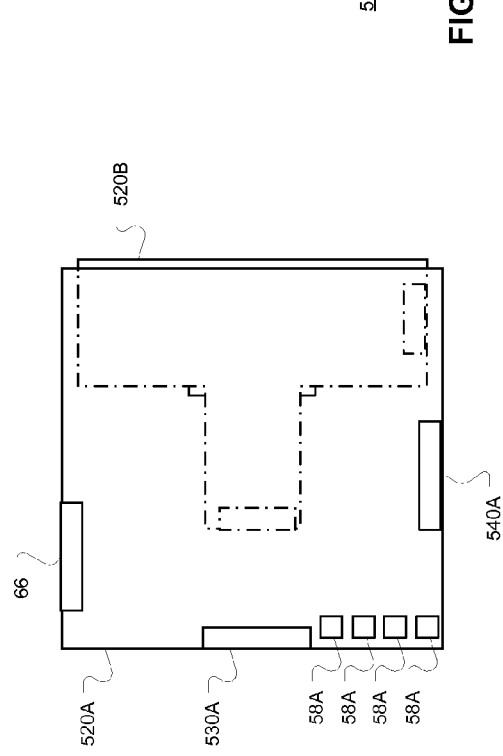

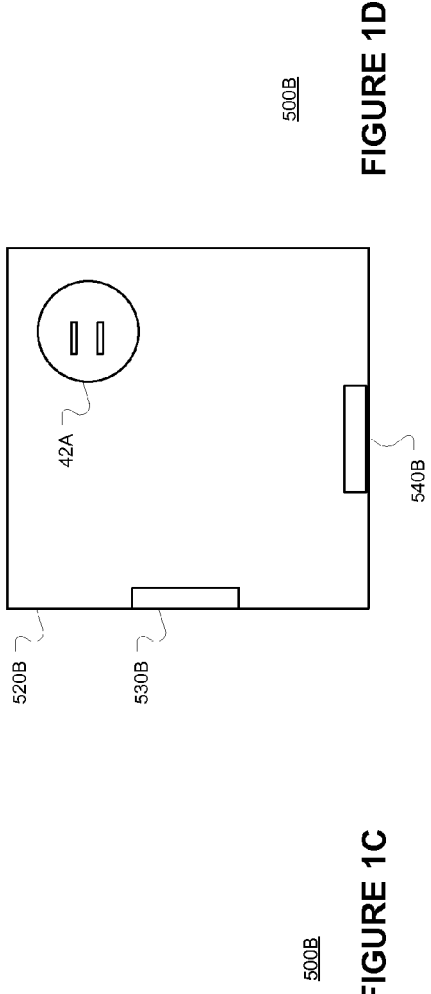
FIGURE 1C
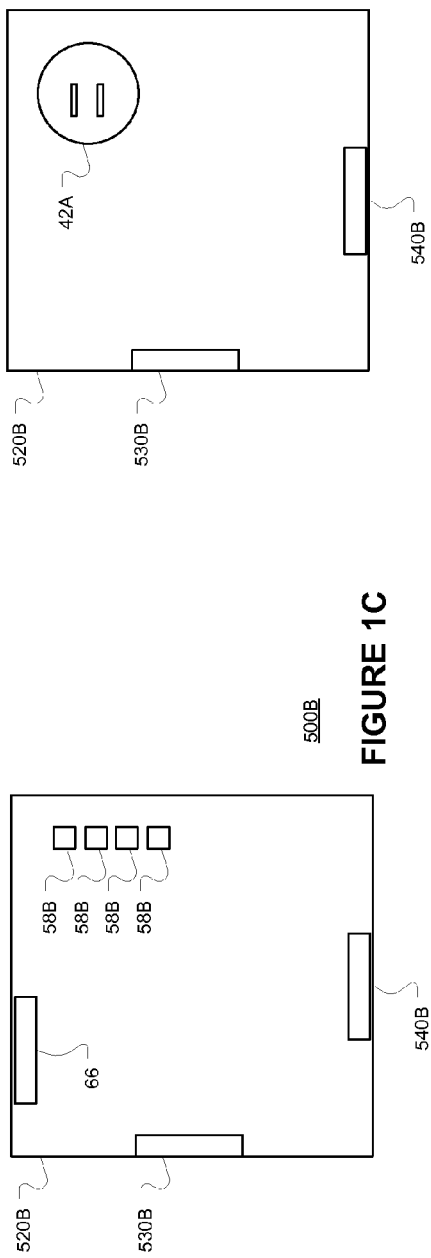
FIGURE 1E
FIGURE 1D
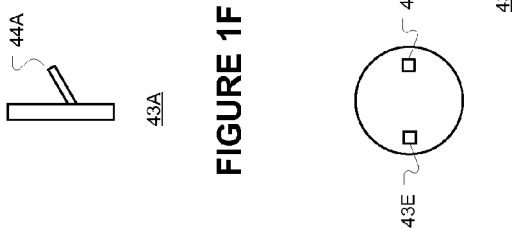
FIGURE 1F
FIGURE 1G
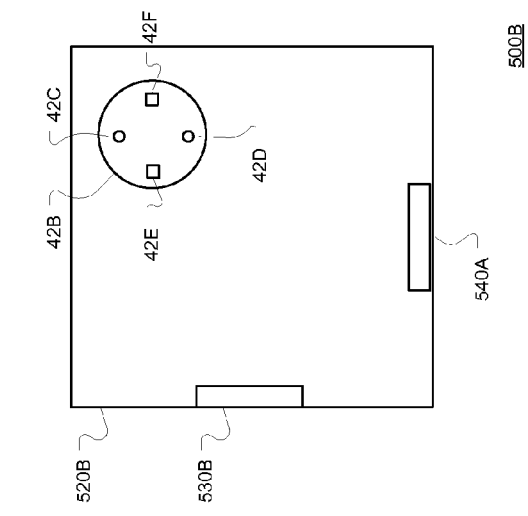
FIGURE 1H
FIGURE 1I

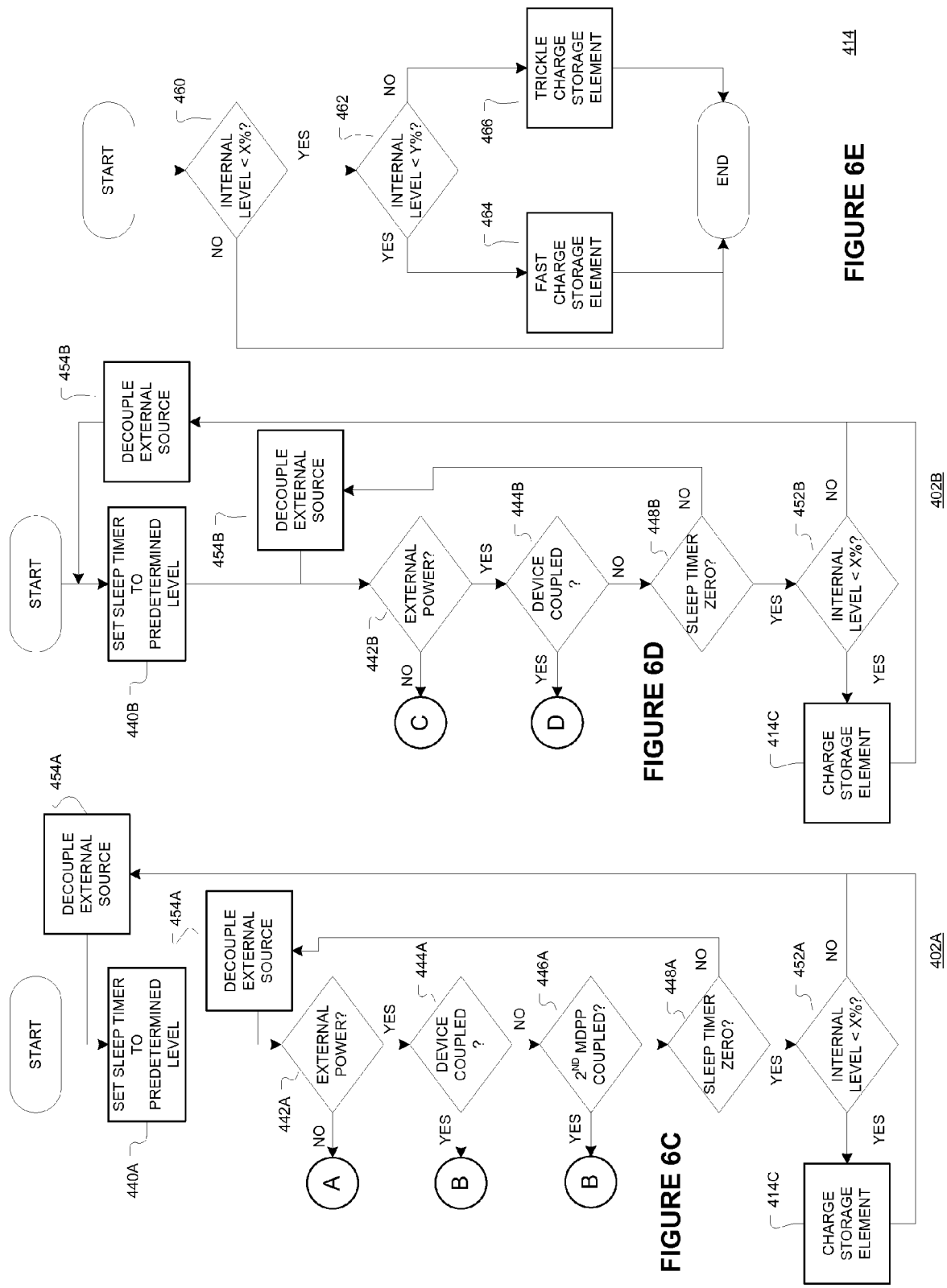

APPARATUS AND METHOD FOR COMMUNICATING DATA AND POWER WITH ELECTRONIC DEVICES

CROSS REFERENCE TO RELATED APPLICATIONS

The present application claims priority under 35 USC section 120 as a Continuation of application Ser. No. 13/348,592, entitled "APPARATUS AND METHODS FOR POWERING MOBILE DEVICES", and filed on Jan. 11, 2012, which is a Continuation-in-Part of application Ser. No. 12/572,276, entitled "APPARATUS AND METHODS FOR POWERING MOBILE DEVICES", and filed on Oct. 2, 2009 and claims priority under 35 USC section 119 to application Ser. No. 61/453,114, entitled "APPARATUS AND METHOD FOR PROVIDING POWER TO AND COMMUNICATING DATA WITH ELECTRONIC DEVICES", and filed on Mar. 15, 2011, application Ser. No. 61/158,735, entitled "APPARATUS AND METHOD FOR POWERING A MOBILE DEVICE", and filed on Mar. 9, 2009, and application Ser. No. 61/180,836, entitled "APPARATUS AND METHOD FOR POWERING A MOBILE DEVICES", and filed on May 22, 2009, each application is considered as being part of the disclosure of the accompanying application and is hereby incorporated herein by reference. The present application is also related to PCT Application PCT/US10/26573, entitled "APPARATUS AND METHOD FOR POWERING ELECTRONIC DEVICES", and filed on Mar. 8, 2010, this application is considered as being part of the disclosure of the accompanying application and is hereby incorporated herein by reference.

TECHNICAL FIELD

Various embodiments described herein relate to apparatus for communicating electrical power or data with electronic devices.

BACKGROUND INFORMATION

It may be desirable to be able to communicate power and data with one or more electronic devices using a single device coupled or uncoupled to an independent or external power source. The present invention provides devices for same.

BRIEF DESCRIPTION OF THE DRAWINGS

FIG. 1A is a simplified diagram of an electronic device power and data communication architecture with two power and data communication elements decoupled according to various embodiments.

FIG. 1B is a simplified diagram of an electronic device power and data communication architecture with two power and data communication elements coupled according to various embodiments.

FIG. 1C is a front view of a simplified diagram of an electronic device power and data communication architecture according to various embodiments.

FIG. 1D is a back view of a simplified diagram of electronic device power and data communication architecture according to various embodiments.

FIG. 1E is another back view of a simplified diagram of an electronic device power and data communication architecture and external power source cavity according to various embodiments.

FIG. 1F-1I are simplified diagrams of electronic device power and data communication architecture external power source mechanical interfaces according to various embodiments.

FIGS. 6A-6E are flow diagrams illustrating several methods according to various embodiments.

DETAILED DESCRIPTION

Figure 2A:
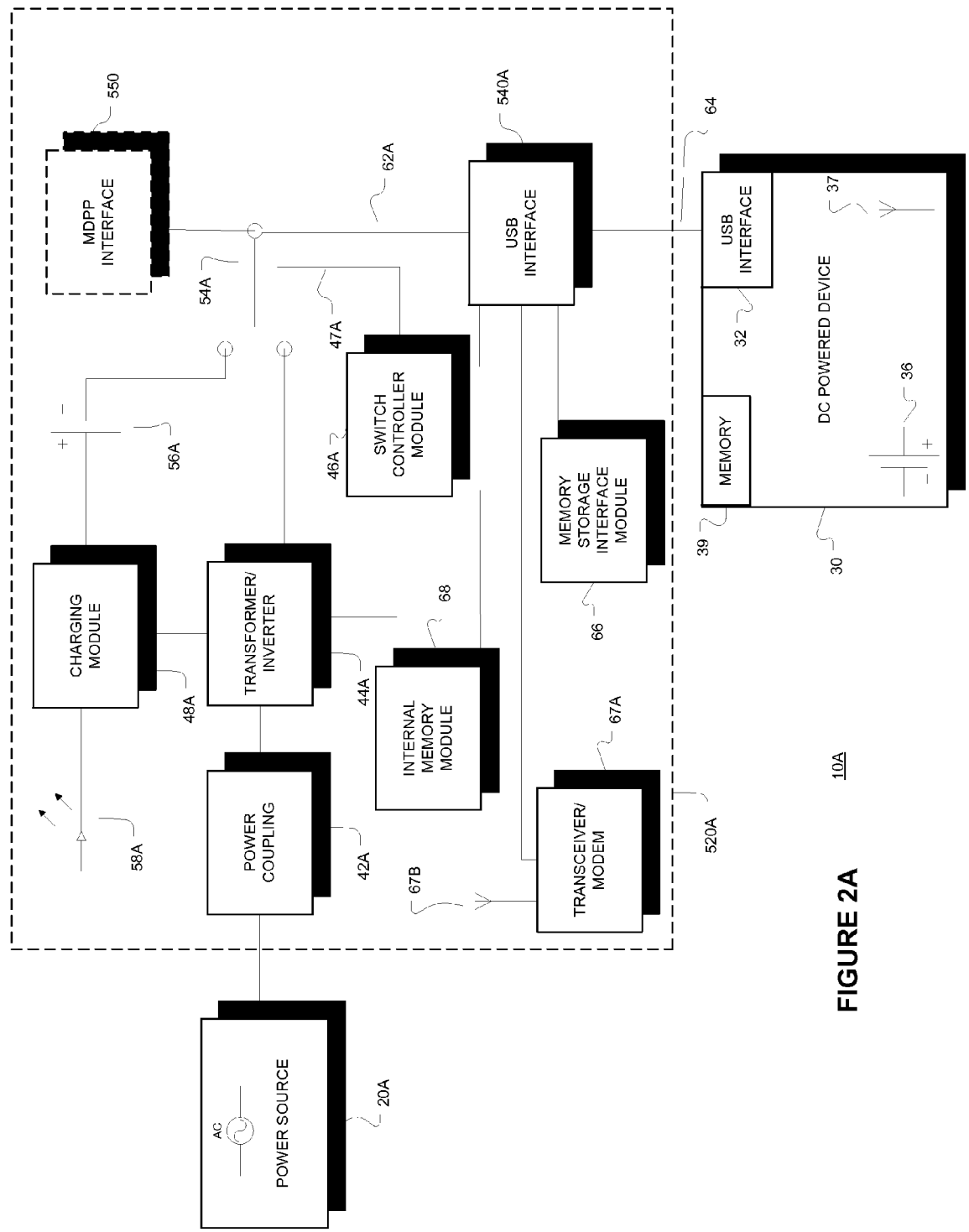
FIG. 2A is a block diagram of an architecture including a first electronic device power and data communication element according to various embodiments.

FIGS. 1A and 1B are simplified diagrams of electronic device power and data communication architecture 500A according to various embodiments. The architecture 500A includes two, separable electronic device power and data communication (EDPDC) apparatus 520A, 520B where the second EDPDC apparatus 520B may be couplable with the first EDPDC apparatus 520A. In an embodiment the second EDPDC apparatus 520B may be recessed in at least a portion 550 of the first EDPDC apparatus 520A as shown in FIG. 1B. In an embodiment the first EDPDC apparatus 520A may include a first external or independent power input coupling 530A and a second external power input mechanical coupling 42A, an electronic device power and data interface ("EDPDI") 540A, a second EDPDC apparatus power output interface 550, a data memory storage interface module (DMSI) 66, an internal memory module (IMM) 68 (shown in FIG. 2A and others), an internal transceiver/modem module (TMM) 67A, an internal antenna 67B, and a plurality of user perceptible signal generation devices 58A.

FIG. 1F-1I are simplified diagrams of EDPDC architecture external power source mechanical interfaces 43A, 43B according to various embodiments. Each external power source mechanical interfaces 43A, 43B may be removably couplable to an external power source cavity (42B in FIG. 1E). The cavity 42B may have a plurality of electrical contacts 42C-42F that may couple various electrical contacts 43C-43F of the external power source mechanical interfaces 43A, 43B. In an embodiment, the external power source mechanical interfaces 43A, 43B may be configured to couple to an external alternating current (AC) power source where power characteristics of the external AC power source may vary geographically as well known to one of skill in the art, e.g., the operating voltage may be about 100, 110, and 220 volts. In order to prevent potential damage to AC powered devices, different external AC power sources may require different mechanical interfaces (44A, 44B).

In an embodiment the external power source mechanical interface 43A may have electrical contacts 43E, 43F that engage contacts 42E, 42F when the interface 43A is inserted into the cavity 42B. Similarly, the external power source mechanical interface 43B may have electrical contacts 43C, 43D that engage contacts 42C, 42D when the interface 43B is inserted into the cavity 42B. Contacts 42E, 42F may be configured to receive external AC power having one of a voltage about 100 or 110 volts and about 220 volts. Similarly, Contacts 42C, 42D may be configured to receive external AC power having one of a voltage about 220 volts and about 100 or 110 volts. In an embodiment an external power source mechanical interface 43A, 43B may be rotatably inserted into the cavity 42B. Further, the external power source mechanical interface 43A, 43B prongs 44A, 44B may be foldable within the interface 43A, 43B.

In an embodiment, the interface 43A prongs 44A may be straight blades that are designed to couple to an external AC power source having about a 100 or 110 voltage and the contacts 42E, 42F may be configured to be coupled to an AC power source having about a 100 or 110 voltage. The interface 43B prongs 44B may be cylindrical and designed to be coupled to an external AC power source having about a 220 voltage and the contacts 42C, 42D may be configured to be coupled to an AC power source having about a 220 voltage.

The second EDPDC apparatus or module 520B may include a power input coupling 530B, an EDPDI (EDPI) 540B, and a plurality of user perceptible signal generation devices 58B. In an embodiment the first EDPDC apparatus 520A via interface 550 may provide one of AC or direct current (DC) power to the second EDPDC apparatus 520B via the power input coupling 530B. In the first and the second EDPDC apparatus 520A, 520B, the user perceptible signal generation devices 58B may provide an indication of the device's operation including whether the device is coupled to an external power source, an internal power storage unit level (56A, 56B, FIGS. 2A, 2B), charging status of an internal power storage unit, discharge state of an internal power storage unit, data communication between the EDPDC apparatus 520A or 520B and another device 30, and the EDPDC apparatus receiving power from another device 30 (see FIG. 2A).

The EDPDC architecture 500A may include a data memory storage interface ("DMSI") module 66 that may interface with one or more memory devices including a compact flash card, secure digital (SD), miniSD, microSD, SD high capacity (SDHC), miniSDHC, microSDHC, SD extended capacity, and memory stick. The DMSI 66 may conform to the SD input-output (SDIO) standard to enable a data memory card and other devices to communicate electronic data with via the electronic device power and data interface (EDPDI) 540A. The other devices may include a Bluetooth interface and broadband data interface. The EDPDC architecture 500A may also include internal, non-volatile and volatile electronic data internal memory modules ("IDM") 68 where the electronic data may be communicated via the EDPDI 540A.

Figure 10:
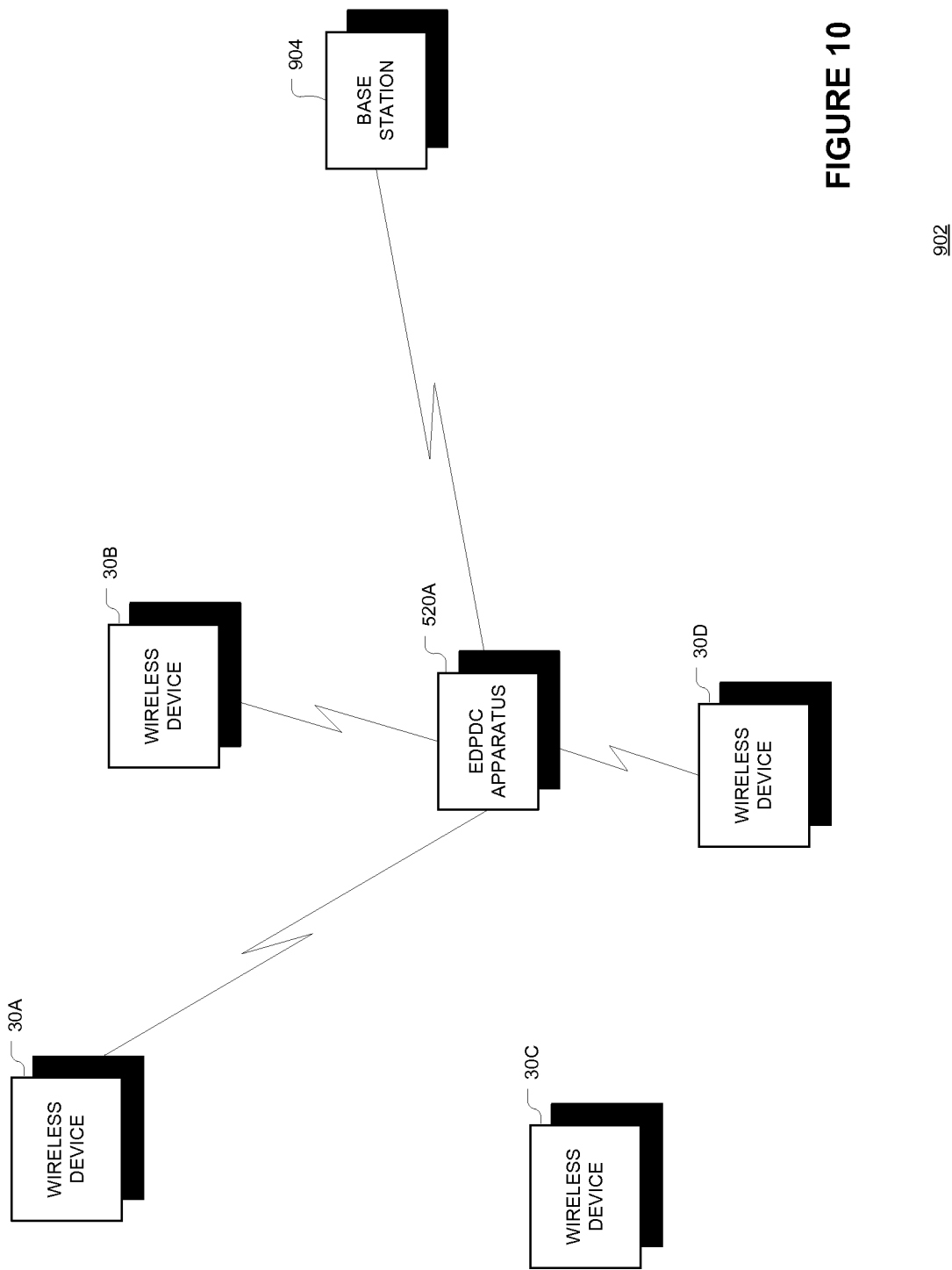
FIG. 10 is a block diagram of a communication architecture comprising electronic devices, an EDPDC apparatus, and base station according to various embodiments.

The EDPDC architecture 500A may also include a transceiver and modulator/demodulator module (TMM) 67A (FIG. 2A) coupled to an internal antenna 67B (FIG. 2A). The TMM 67A may be any device capable or communicating data in one or more data communication formats including wireless and wired formats. Referring to FIG. 10, the TMM 67A may be included in an EDPDC apparatus 520A. The EDPDC apparatus 520A may be part of a wireless architecture 902 that may include one or more wireless or wired devices 30A to 30D and a wireless data or voice provider base station 904. In an embodiment the EDPDC apparatus 520A may include a TMM 67A and antenna 67B coupled to the TMM 67A. The TMM 67A may include a transceiver and modem that may communicate digital data or voice signals with one or more electronic devices (30A to 30D) and the digital data and voice signal base station 902. The base station 904 may be part of a larger network that may communicate with other base stations, electronics devices 30, EDPDC apparatus 520A 500A, 500B, 500B, 520B, 140A, 140B, 240A, 240B, 340A, 340B, 640A, 640B, 700, 800, 900A, 900B, 900C, computers, and networks of networks (commonly termed the "Internet"). In an embodiment the base station 904 may communicate data with the EDPDC apparatus 520A TMM 67A using one or more known digital communication formats including a cellular protocol such as code division multiple access (CDMA), time division multiple access (TDMA), Global System for Mobile Communications (GSM), cellular digital packet data (CDPD), Worldwide Interoperability for Microwave Access (WiMAX), satellite format (COMSAT) format, and local protocol such as wireless local area network (commonly called "WiFi") and Bluetooth.

In an embodiment, the EDPDC apparatus 520A TMM 67A may communicate digital signals with the base station 904 using a first digital communication protocol and the electronic devices 30A to 30D using a second, different communication protocol. For example, the EDPDC apparatus 520A TMM 67A may communicate with the base station 904 using a cellular protocol such as code division multiple access (CDMA), time division multiple access (TDMA), Global System for Mobile Communications (GSM), Worldwide Interoperability for Microwave Access (WiMAX) or COMSAT protocol and communicate with the electronic devices 30A to 30D using a local protocol including WiFi and Bluetooth.

As known to one skilled on the art the Bluetooth protocol includes several versions including v1.0, v1.0B, v1.1, v1.2, v2.0+EDR, v2.1+EDR, v3.0+HS, and v4.0. The Bluetooth protocol is an efficient packet-based protocol that may employ frequency-hopping spread spectrum radio communication signals with up to 79 bands, each band 1 MHz in width, the respective 79 bands operating in the frequency range 2402-2480 MHz. Non-EDR (extended data rate) Bluetooth protocols may employ a Gaussian frequency-shift keying (GFSK) modulation. EDR Bluetooth may employ a differential quadrature phase-shift keying (DQPSK) modulation.

The WiFi protocol may conform to an Institute of Electrical and Electronics Engineers (IEEE) 802.11 protocol. The IEEE 802.11 protocols may employ a single-carrier direct-sequence spread spectrum radio technology and a multi-carrier orthogonal frequency-division multiplexing (OFDM) protocol. In an embodiment, one or more electronic devices 30A to 30D may communicate with the EDPDC apparatus 520A TMM 67A via a WiFi protocol.

The cellular formats CDMA, TDMA, GSM, CDPD, and WiMax are well known to one skilled in the art. It is noted that the WiMax protocol may be used for local communication between the one or more electronic devices 30A to 30D and the EDPDC apparatus 520A TMM 67A. The WiMax protocol is part of an evolving family of standards being developed by the Institute of Electrical and Electronic Engineers (IEEE) to define parameters of a point-to-multipoint wireless, packet-switched communications systems. In particular, the 802.16 family of standards (e.g., the IEEE std. 802.16-2004 (published Sep. 18, 2004)) may provide for fixed, portable, and/or mobile broadband wireless access networks. Additional information regarding the IEEE 802.16 standard may be found in IEEE Standard for Local and Metropolitan Area Networks—Part 16: Air Interface for Fixed Broadband Wireless Access Systems (published Oct. 1, 2004). See also IEEE 802.16E-2005, IEEE Standard for Local and Metropolitan Area Networks—Part 16: Air Interface for Fixed and Mobile Broadband Wireless Access Systems—Amendment for Physical and Medium Access Control Layers for Combined Fixed and Mobile Operation in Licensed Bands (published Feb. 28, 2006). Further, the Worldwide Interoperability for Microwave Access (WiMAX) Forum facilitates the deployment of broadband wireless networks based on the IEEE 802.16 standards. For convenience, the terms "802.16" and "WiMAX" may be used interchangeably throughout this disclosure to refer to the IEEE 802.16 suite of air interface standards.

In an embodiment, one or more electronic devices 30A to 30D may be coupled the the EDPDC apparatus 500A, 500B, 520A, 520B, 140A, 140B, 240A, 240B, 340A, 340B, 640A, 640B, 700, 800, 900A, 900B, 900C TMM 67A via a physical connection such as 540A, 540B shown in FIG. 1A. The TMM 67A may employ one or more wired digital data communication protocols to communicate with an electronic device 30A to 30D in such an embodiment including the Ethernet protocol or Internet protocol (IP), IEEE 802.3. Using wired or wireless communication, an EDPDC apparatus 520A may enable an electronic device 30A to 30D to communicate digital with the Internet and corresponding act as a "mobile hotspot" or mobile broadband device. In an embodiment the antenna 67B may be circular antenna with multiple, selectable connections to elect the wavelength/frequency of signals to be communicated with an electronic device 30A to 30D and base station 920.

FIG. 1C is a front view of a simplified diagram of another EDPDC architecture 500B according to various embodiments and FIG. 1D is a back view of the simplified diagram of the EDPDC architecture 500B according to various embodiments. The architecture 500B may include a first external or independent power input coupling 530B and a second external power input mechanical coupling 42A, an EDPDI 540B, a data memory storage interface module (DMSI) 66, an internal memory module (IMM) 68 (shown in FIG. 2A and others), TMM 67A, an antenna 67B, and a plurality of user perceptible signal generation devices 58B. FIG. 1E is a back view of a simplified diagram of the EDPDC architecture 500B external power source cavity 42B according to various embodiments where the EDPDC architecture external power source mechanical interfaces 43A, 43B may be removably couplable to the external power source cavity 42B.

The cavity 42B may have a plurality of electrical contacts 42C-42F that may couple various electrical contacts 43C-43F of the external power source mechanical interfaces 43A, 43B. The user perceptible signal generation devices 58B may provide an indication of the architecture's 500B operation including whether the device is coupled to an external power source, an internal power storage unit level (56B, FIG. 2B), charging status of an internal power storage unit, discharge state of an internal power storage unit, and power received from an EDPDI 540B.

FIG. 2A is a block diagram of an EDPDC architecture 10A according to various embodiments. The EDPDC architecture 10A may include an external power source 20A, an EDPDC apparatus 520A, and an electronic device 30 that may be DC powered. The electronic device 30 may be powered by an interface 32, including a USB interface 32 (FIG. 1C, 1D) or a device specific power interface (132 in FIGS. 2A and 2B). An electronic device 30, 30A to 30D, 130, 230 may be coupled to a EDPDC apparatus 520A, 520B, 140A, 140B, 340A, 340B, 640A, 640B, 700, 800, 900A to 900C via cable(s) 64, 164, 64A, 64B coupling the electronic device 30, 30A to 30D, 130, 230 interface 32, 132, 32A, 32B to a EDPDC apparatus 520A, 520B, 140A, 140B, 640A, 640B, 700, 800, 900A to 900C interface 152A, 152B, 252A, 252B, 352A, 540A, 540B, 552A, 552B. The EDPDC apparatus 520A, 520B, 140A, 140B, 640A, 640B, 700, 800, 900A to 900C may provide electrical energy to one or more electrically powered devices 30, 130, 230, 30A to 30D via the interface 32, 132, 32A, 32B where the electrical energy may DC electrical energy. It is noted that a one or more electrically powered devices 30, 130, 230, 30A to 30D may provide power to an EDPDC apparatus 520A, 520B, 140A, 140B, 640A, 640B, 700, 800, 900A to 900C via the interface 32, 132, 32A, 32B.

In an embodiment a powered device 30, 130, 230, 30A to 30D may include a rechargeable electrical storage element 36. The EDPDC apparatus 520A, 520B, 140A, 140B, 340A, 340B, 640A, 640B, 700, 800, 900A to 900C may communicate (provide or receive) electrical energy to one or more electrically powered devices 30, 130, 230, 30A, 30B, 30C, 30D via the interface 32, 132, 32A, 32B that is sufficient to a) power devices 30, 130, 230, 30A, 30B, 30C, 30D, b) charge an electrical storage element 36 of devices 30, 130, 230, 30A, 30B, 30C, 30D, and c) simultaneously power devices 30, 130, 230, 30A, 30B, 30C, 30D and charge an electrical storage element 36 of devices 30, 130, 230, 30A, 30B, 30C, 30D, and power and/or charge an EDPDC apparatus 520A, 520B, 140A, 140B, 340A, 340B, 640A, 640B, 700, 800, 900A to 900C or its electrical energy storage element 56A (receiving power from devices 30, 130, 230, 30A, 30B, 30C, 30D). The electrical signal may have a DC or AC format in an embodiment.

Figure 3A:
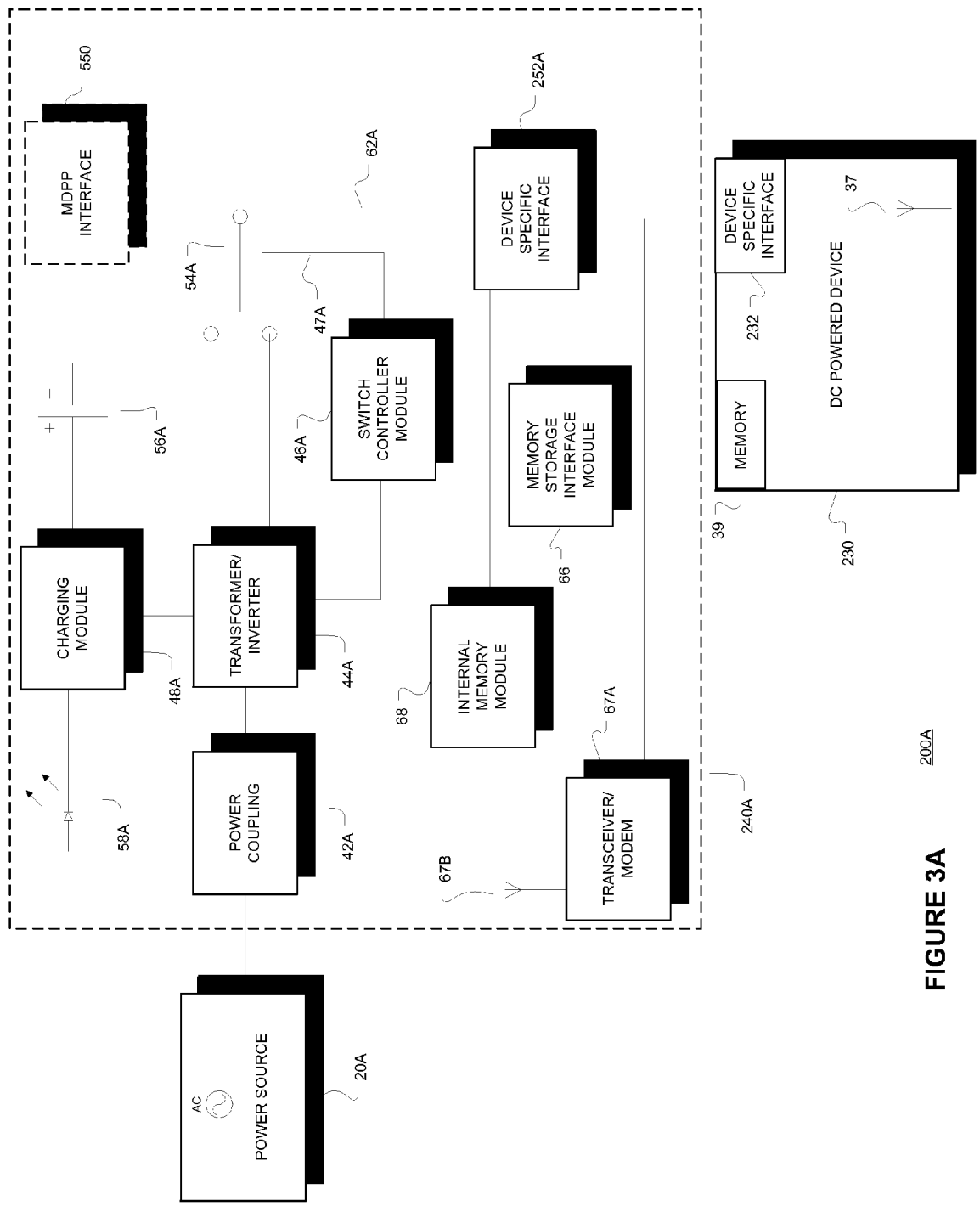
FIG. 3A is a block diagram of an architecture including a first electronic device power and data communication element according to various embodiments.

The electrical storage element 36 may be a re-chargeable battery, capacitor, or other device capable of temporarily storing electrical energy. The electronic devices 30, 130, 230, 30A, 30B, 30C, 30D may include an antenna 37 to wirelessly communicate signals with an EDPDC apparatus 520A, 520B, 140A, 140B, 240A, 240B, 340A, 340B, 640A, 640B, 700, 800, 900A, 900B, 900C another electronic device 30, 130, 230, 30A, 30B, 30C, 30D, or base station 920. In an embodiment electrical energy may be communicated between an EDPDC apparatus 520A and electronic device 30 via magnetic energy (no direct wiring) such as shown in FIG. 3A.

In an embodiment the EDPDC apparatus 520A of FIG. 2A may include an external electrical power coupling 42A, transformer/inverter 44A, switch controller module 46A, charging module 48A, universal serial bus (USB) interface 540A, multiple position switch 54A, electrical storage element 56A, second EDPDC apparatus interface 550, a data memory storage interface module (DMSI) 66, an internal memory module (IMM) 68, a TMM 67A, an antenna 67B, and one or more user detectable signal generation modules 58A. The interface 540A may be any electronic interface that can communicate at least power including a USB interface 540A. The interface 540A may also enable communication of data between the EDPDC apparatus 520A and the electronic device 30 including with the IMM 68 and DMSI 66. The EDPDC apparatus 520A may be part of the architecture 500A and 500B where the second EDPDC apparatus interface 550 may be optionally excluded in the architecture 500B. The external power source 20A may supply AC or DC power.

In an embodiment, the external power source 20A may be an AC power source. The external power source 20A may be part of an electrical distribution network, independent electrical source, or localized electrical source including a battery 36, generator, or solar generation module. The AC coupling 42A may include multiple electrical contacts that enable an EDPDC apparatus 520A to receive AC from an external power source 20A. In an embodiment the external power source 20A may supply AC power to the AC coupling 42A via a standard outlet where the AC coupling includes two for a non-grounded application and three prongs for a grounded application.

The transformer/inverter 44A may receive external power and convert the received power to a power format/signal having a predetermined voltage and amperage as needed or required by one or more powered devices 30, 130, 230, 30A, 30B, 30C, and 30D including a DC powered signal in an embodiment. The transformer/inverter 44A may also provide electrical energy to a charging module 48A where the electrical energy may be the same as the DC power provided to or to be provided to DC powered devices 30, 130, 230, 30A, 30B, 30C, and 30D or another electrical signal including an AC or DC signal having various waveforms. The transformer/inverter 44A may also provide electrical energy or an indication of energy generation to a switch controller module 46A where the electrical energy may be the same as the DC power provided to be provided to a DC powered devices 30, 130, 230, 30A, 30B, 30C, and 30D or another electrical signal including an AC or DC signal having various waveforms that provide an indication of whether sufficient energy is being provided by the transformer/inverter 44A to power the DC powered devices 30, 130, 230, 30A, 30B, 30C, and 30D.

It is noted in an embodiment the transformer/inverter may receive electrical energy from the power coupling and the USB interface 540A (from an electronic device (ED) 30). In such an embodiment an ED 30, 30A to 30D, 130, 230, via a wired or wireless interface may provide power to the electrical storage element 56A via the switch 54A, transformer/inverter 44A, and charging module 48A. As noted conversely, the electrical storage element 56A via the switch 54A or power source 20A via power coupling 42A, transformer/inverter 44A and switch 54A may provide power to a device 30, 30A to 30D, 130, 230. Accordingly power may be communicated between the an EDPDC apparatus 520A, 520B, 140A, 140B, 240A, 240B, 340A, 340B, 640A, 640B, 700, 800, 900A, 900B, 900C and ED 30, 30A to 30D, 130, 230.

In an embodiment the charging module 48A may receive electrical energy from the transformer/inverter 44A and charge one or more electrical storage elements 56A. The charging module 48A may provide an electrical signal to the one or more user detectable signal generation modules 58A to inform a user when the electrical storage element 56A is being charged, discharged, external power is present, and when one or more DC powered devices 30, 130, 230, 30A, 30B, 30C, and 30D are electrically coupled to a EDPDC apparatus 540A, 140A, 240A, 340A, 640A. In an embodiment a charging module 48A, 48B may determine a storage element 56A, 56B level and fast charge the storage element 56A, 56B when the determined level is below a first predetermined level, slow or trickle charge the storage element 56A, 56B when the determined level is below a second level and above the first level, the second level greater than the first level, and not charge the storage element 56A, 56B when the determined level is above a second level. In an embodiment the second level may be about 95% of the maximum level and the second level may be about 80% of the maximum level.

The electrical storage element 56A, 56B may include one or more batteries, capacitors, or other electrical energy storage devices including a lithium ion, NiCad, or other rechargeable medium based element. The switch controller module 46A may work in conjunction with the multiple position switch 54A to direct one of energy from the transformer/inverter 44A and the electrical storage element 56A to/from the USB interface 540A via the coupling 62A and the second EDPDC apparatus interface 550. The switch controller module 46A may control the switch 54A as a function of the signal received from or sent to the transformer/inverter 44A via the switch control line 47A.

As noted, the EDPDC apparatus 520A, 520B, 140A, 140B, 340A, 340B, 640A, 640B may provide DC electrical energy to one or more DC powered devices 30, 130, 230, 30A, 30B, 30C, 30D via the interface 32, 132, 32A, 32B. In an embodiment the USB interface 540A may receive the electrical signal 62A from the switch 54A and provide the electrical signal on the appropriate USB contacts of the USB interface to provide DC electrical power via an electrical coupling 64 to the DC powered device 30 USB interface 32. As noted the TMM 67A and the antenna 67B may enable the EDPDC apparatus 520A to communicate with an electronic device 30, 130, 230, 30A, 30B, 30C, 30D and base station 920 using a wired or wireless protocol.

Figure 2B:
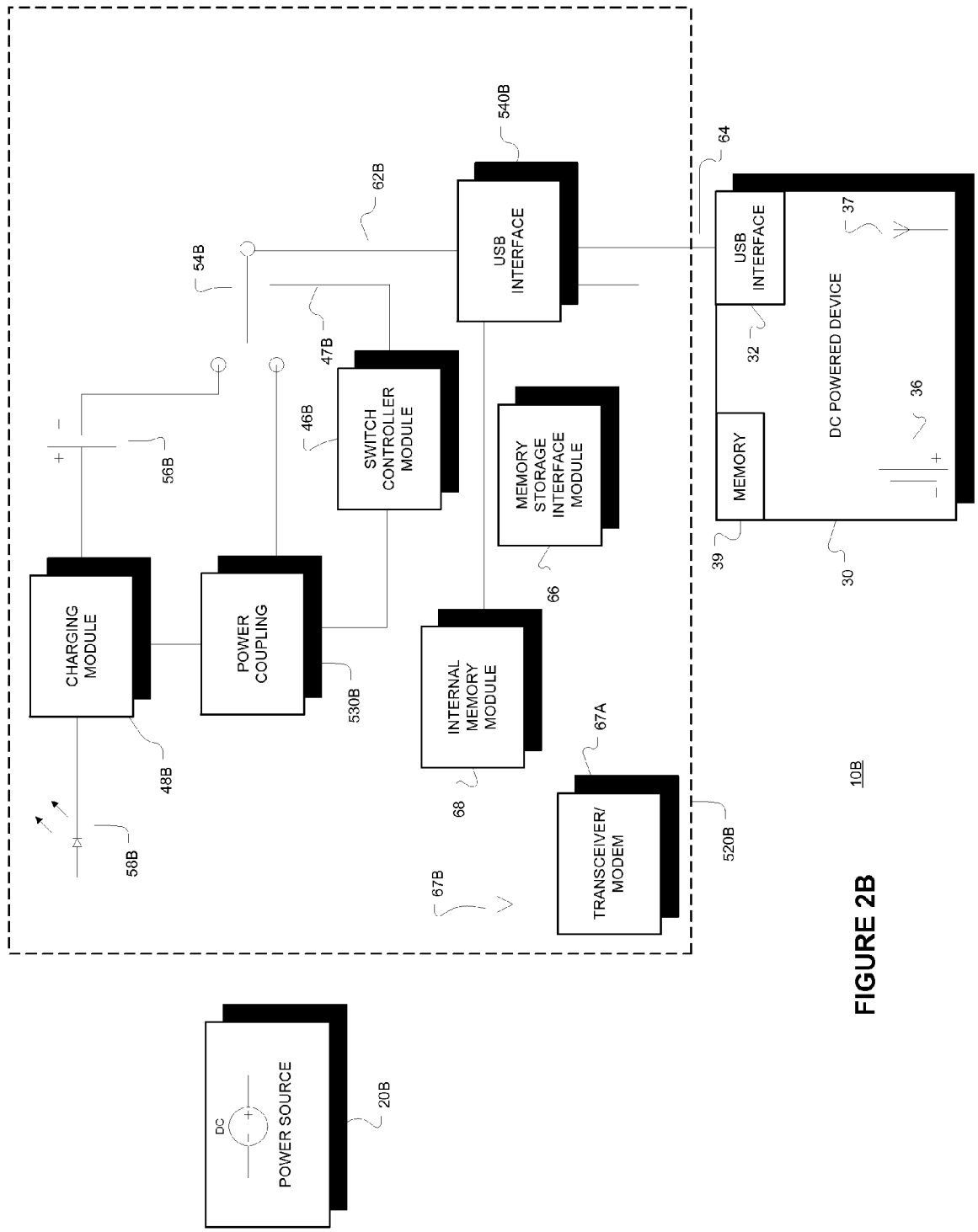
FIG. 2B is a block diagram of an architecture including a second electronic device power and data communication element according to various embodiments.

FIG. 2B is a block diagram of an architecture 10B including a second EDPDC apparatus 520B according to various embodiments. The architecture 10B may include an external power source 20B, a second EDPDC apparatus 520B, and a direct current (DC) powered electronic device 30. The electronic device 30 may communicate power via a USB interface 64 or a device specific power interface (132 in FIGS. 2A and 2B). In an embodiment the EDPDC apparatus 520B of FIG. 1D may include an electrical power coupling 530B, switch controller module 46B, charging module 48B, universal serial bus (USB) interface 540B, multiple position switch 54B, electrical storage element 56B, a data memory storage interface module (DMSI) 66, an internal memory module (IMM) 68, a TMM 67A, an antenna 67B, and one or more user detectable signal generation modules 58B. The interface 540B may be any electronic interface that can communicate at least power including a USB interface 540B. The interface 540B may also enable communication of data between the EDPDC apparatus 520B and the electronic device 30 including with the IMM 68 and DMSI 66. The external power source 20B may supply AC or DC power. In an embodiment, the external power source 20B may be a DC power source. In another embodiment the first EDPDC apparatus 520A via the electronic device interface (MDI) 550 may provide electrical power (DC power in one embodiment) to the second EDPDC apparatus 520B via the power coupling 530B. The external power source 20B may be part of an electrical distribution network, independent electrical source, or localized electrical source including a battery 36, generator, or solar generation module. The power coupling 530B may include multiple electrical contacts that enable an EDPDC apparatus 520A to receive power from an external power source 20B including a MDI 550 of a EDPDC apparatus 520A.

Figure 11B:
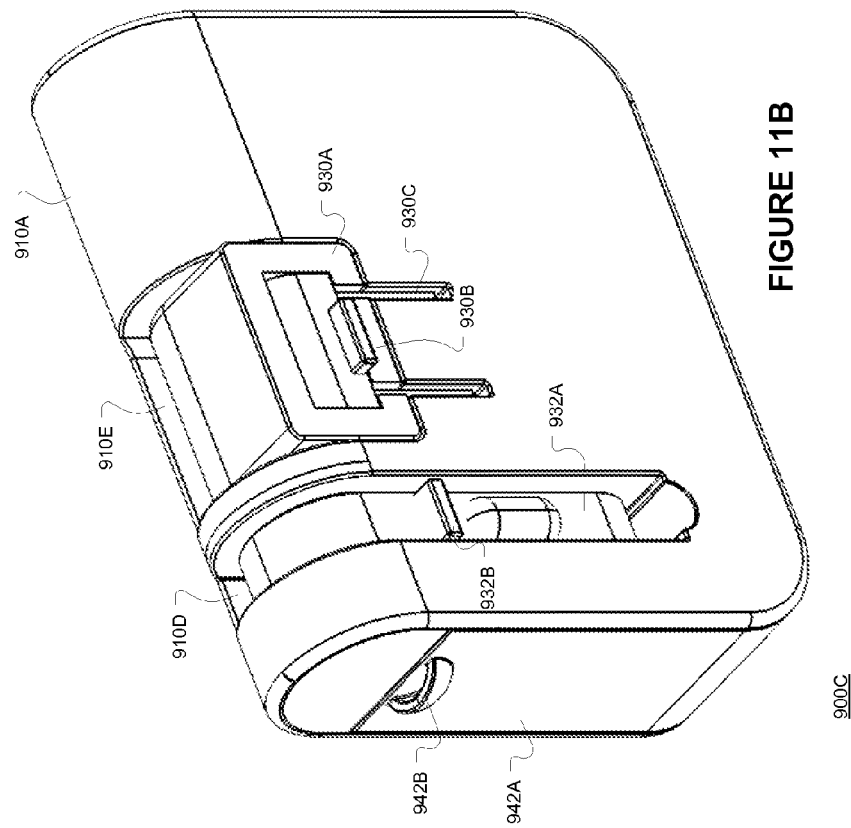
FIGS. 11A, 11B, and 11C are isometric diagrams of architecture including electronic device power and data communication apparatus according to various embodiments.
Figure 11A:
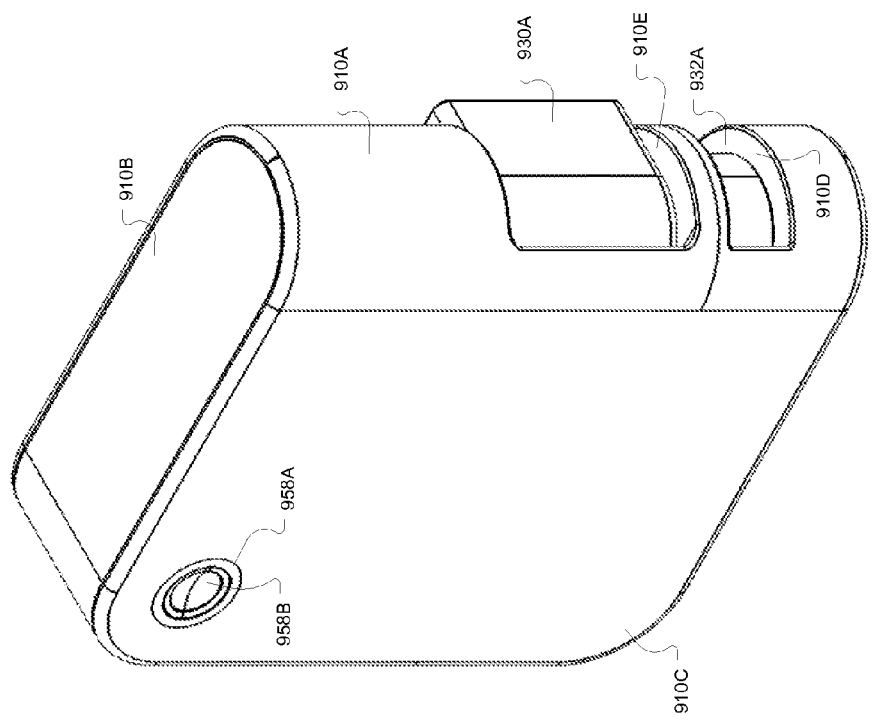
Figure 11C:
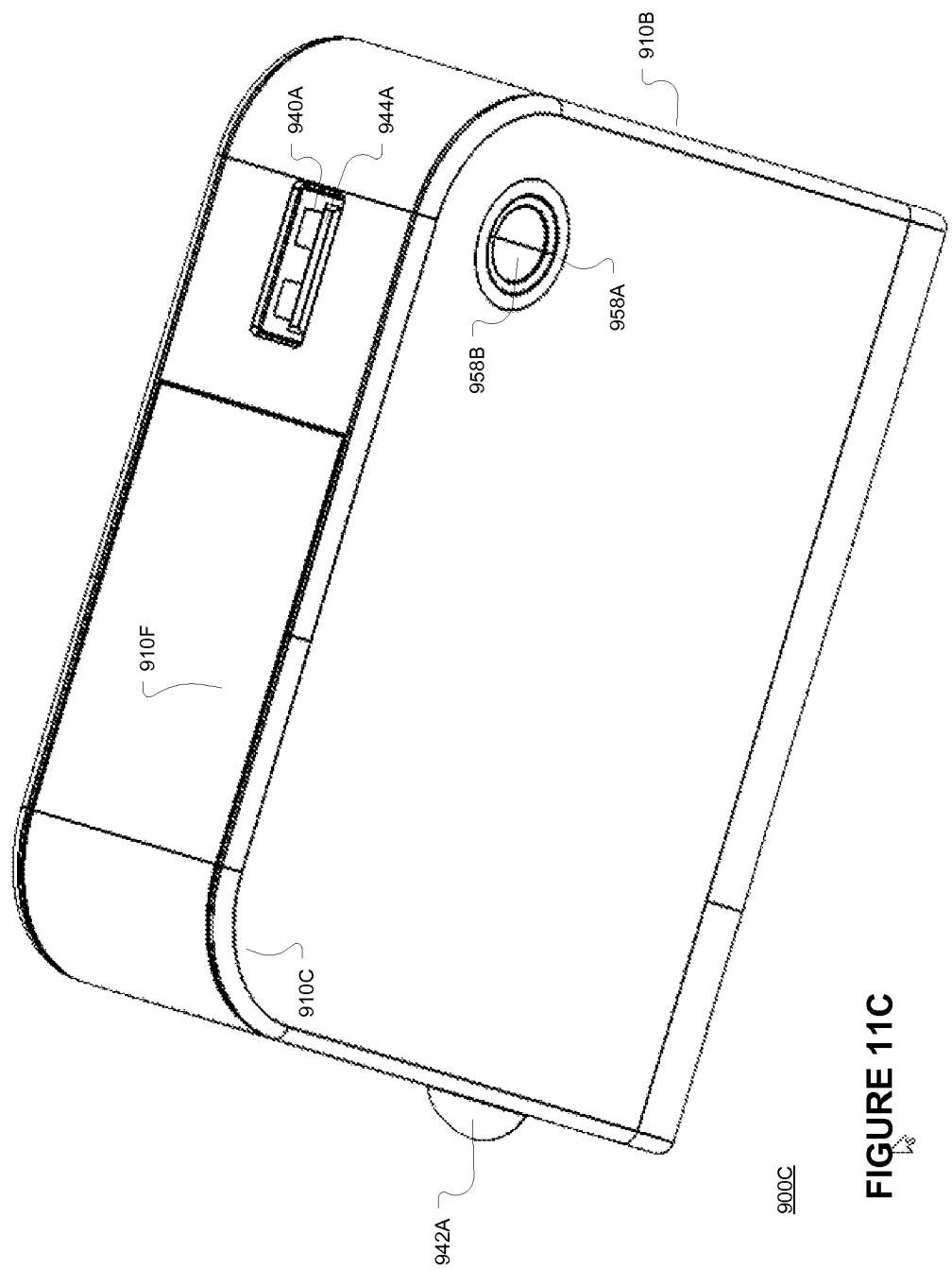
Figure 11E:
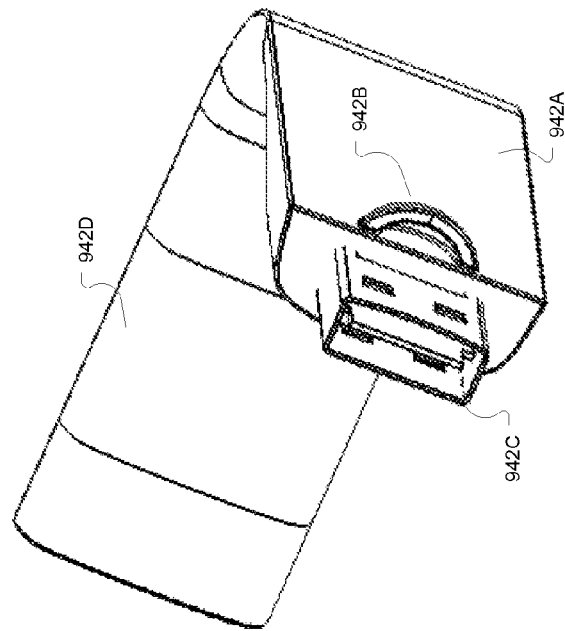
FIG. 11E is a partial diagram of an electrical connector of an electronic device power and data communication apparatus according to various embodiments.
Figure 11D:
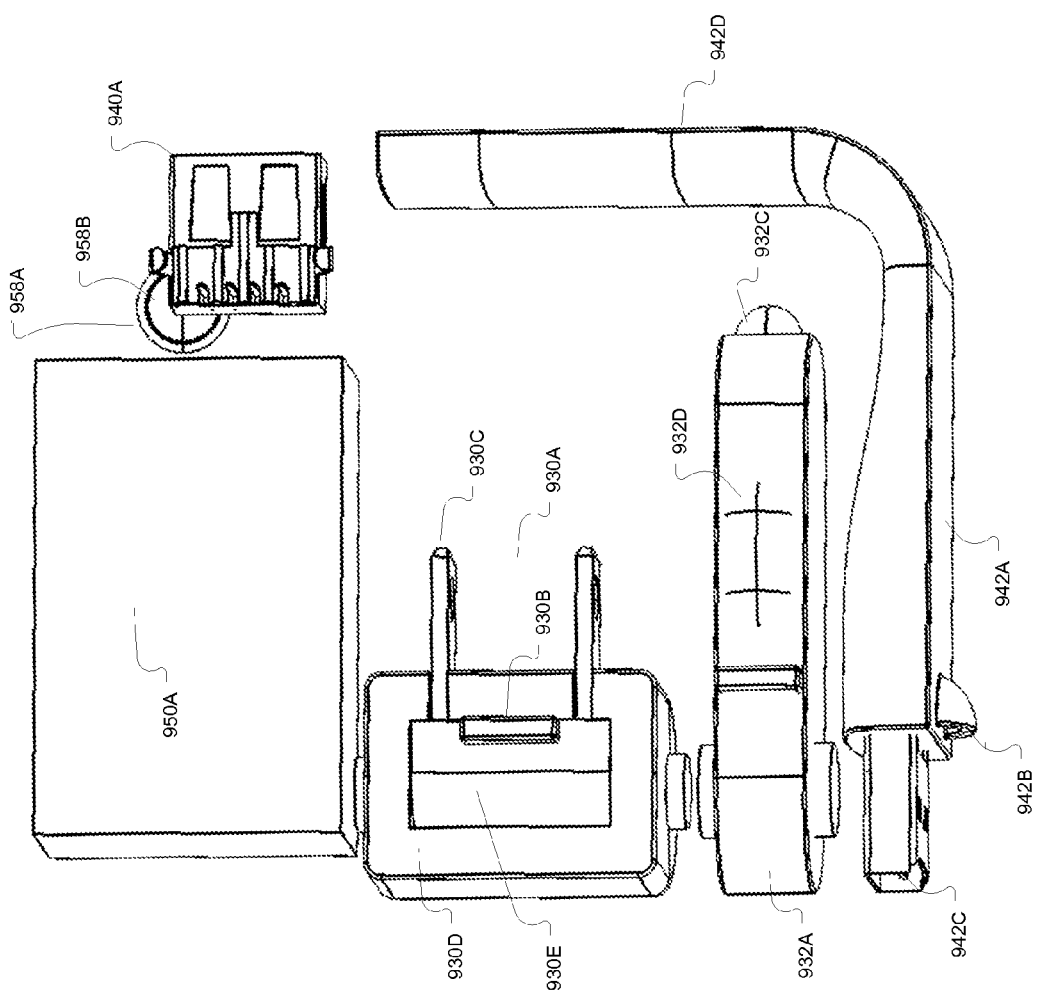
FIG. 11D is an exposed diagram of architecture including electronic device power and data communication apparatus according to various embodiments.

In an embodiment the external power source 20B may supply DC power to the power coupling 42B via a standard accessory or cigarette outlet where the DC coupling 530B is shaped to interface with such a standard outlet (see FIG. 11D, 932A). In an embodiment the EDPDC apparatus 520A MDI 550 may be configured as standard accessory or cigarette outlet to receive the corresponding DC coupling 530B of an EDPDC apparatus 520B. The DC coupling 530B may communicate electrical energy with a charging module 48B where electrical energy may be the same as the DC power communicated with DC powered devices 30, 130, 230, 30A, and 30B or another electrical signal including an AC or DC signal having various waveforms. The power coupling 530B may also provide electrical energy or an indication of energy generation to a switch controller module 46B where the electrical energy may be the same as the DC power communicated with a DC powered devices 30, 130, 230, 30A, and 30B or another electrical signal including an AC or DC signal having various waveforms that provide an indication of whether sufficient energy is being provided by the transformer/inverter 44A to power the DC powered devices 30, 130, 230, 30A, and 30B. As above a DC powered device 30 may also provide power to the EDPDC apparatus 520B and thus power may be communicated between the ED 30 and EDPDC apparatus 520B.

The charging module 48B may receive electrical energy from the power coupling 530B (or USB interface 540B where the ED 30 provides power) and charge one or more electrical storage elements 56B. The charging module 48B may provide an electrical signal to the one or more user detectable signal generation modules 58B to inform a user when the electrical storage element 56B is being charged, discharged, external power is present, and when one or more DC powered devices 30, 130, 230, 30A, and 30B are electrically coupled to a EDPDC apparatus 540A, 140A, 240A, 340A, 640, 700, 800, 900A to 900C. The electrical storage element 56B may include one or more batteries, capacitors, or other electrical energy storage devices. The switch controller module 46B may work in conjunction with the multiple position switch 54B to direct one of energy from the power coupling 530B and the electrical storage element 56B to the USB interface 540B via the coupling 62B. The switch controller module 46B may control the switch 54B as a function of the signal received from the power coupling 530B (or USB interface 540B) via the switch control line 47B.

Figure 2C:
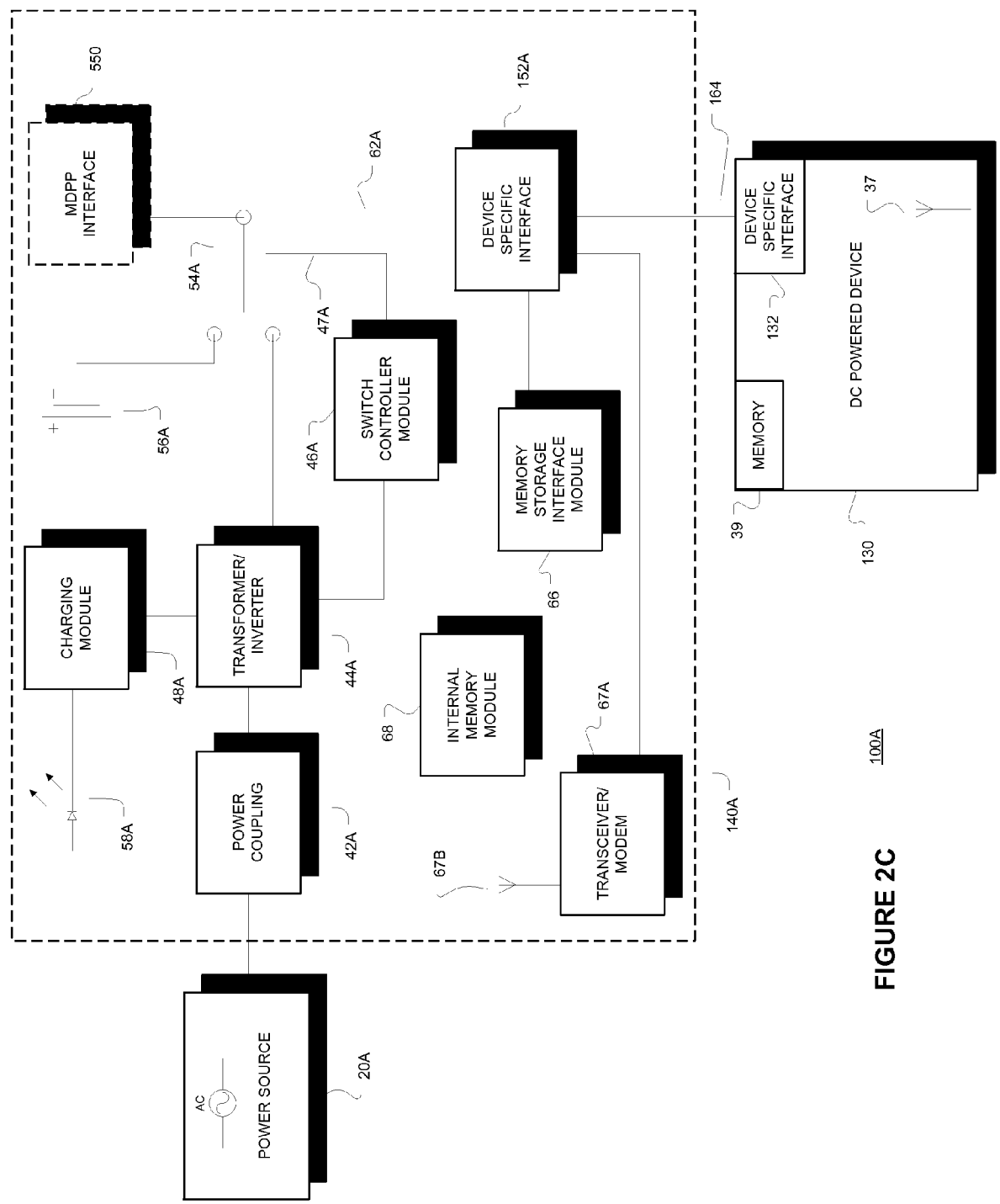
FIG. 2C is a block diagram of an architecture including a first electronic device power and data communication element according to various embodiments.

As noted, an EDPDC apparatus 520A, 520B, 140A, 140B, 340A, 340B, 640A, 640B, 700, 800, 900A to 900C may communicate DC electrical energy with one or more DC powered devices 30, 130, 230, 30A, 30B via the interface 32, 132, 32A, 32B. In an embodiment the USB interface 540B may communicate electrical signals 62B from the switch 54B and communicate the electrical signal on the appropriate USB contacts of the USB interface to communicate DC electrical power via an electrical coupling 64 with the DC powered device 30 USB interface 32. As noted the TMM 67A and the antenna 67B may enable the EDPDC apparatus 520B to communicate with an electronic device 30, 130, 230, 30A, 30B, 30C, 30D and base station 920 using a wired or wireless protocol FIG. 2C is a block diagram of another EDPDC architecture 100A according to various embodiments. The DC powered device 130 in the architecture 100A may have a device specific power or data communication interface 132. The EDPDC apparatus 140A may include an Alternating Current (AC) or DC electrical power coupling 42A, transformer/inverter 44A, a switch controller module 46A, a charging module 48A, a device specific interface 152A, a multiple position switch 54A, an electrical storage element 56A, a EDPDC apparatus interface 550 (for 500A), a data memory storage interface module (DMSI) 66, an internal memory module (IMM) 68, and one or more user detectable signal generation modules 58A. The interface 152A may be any electronic interface that can communicate at least power including a USB interface 540A. The interface 152A may also enable communication of data between the EDPDC apparatus 140A and the electronic device 130 including with the IMM 68 and DMSI 66. The EDPDC apparatus 140A is similar to EDPDC apparatus 520A other than the device specific interface 152. In an embodiment the device specific interface 152A may receive an electrical signal 62A from the switch 54A and provide the electrical signal on the appropriate contacts of the device specific interface 152A to communicate DC electrical power via an electrical coupling 164 with the DC powered device 130 device specific interface 132. As noted the TMM 67A and the antenna 67B may enable the EDPDC apparatus 140A to communicate with an electronic device 30, 130, 230, 30A, 30B, 30C, 30D and base station 920 using a wired or wireless protocol. The device specific interface 152A may receive electrical energy from the ED 130 and provide electrical energy (power) to the ED 130, accordingly communicate power with the ED 130.

Figure 2D:
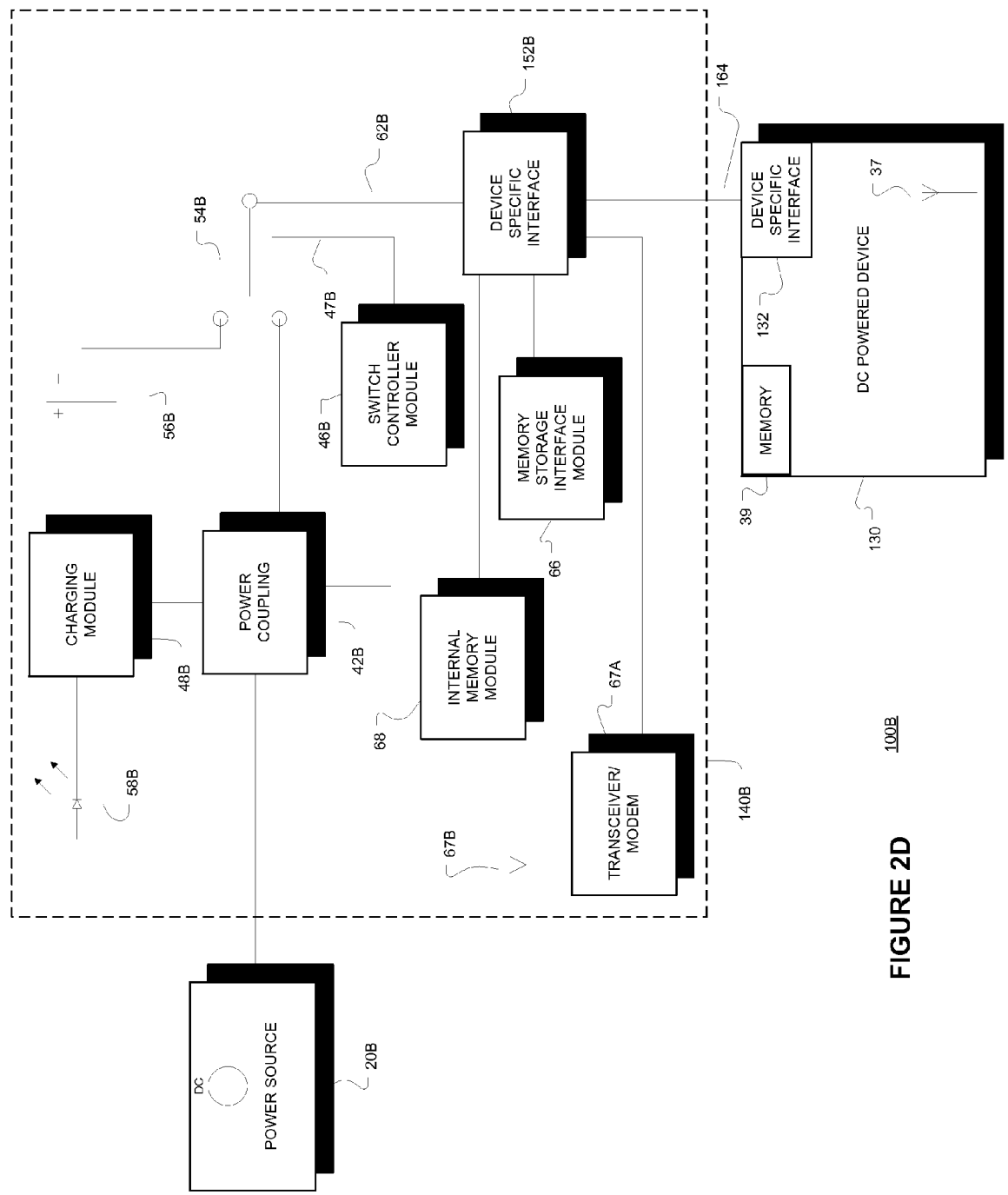
FIG. 2D is a block diagram of an architecture including a second electronic device power and data communication element according to various embodiments.

FIG. 2D is a block diagram of another EDPDC apparatus architecture 100B according to various embodiments. The DC powered device 130 in the architecture 100A may have a device specific power supply interface 132. The EDPDC apparatus 140B may include an electrical power coupling 42B, a switch controller module 46B, a charging module 48B, a device specific interface 152B, a multiple position switch 54B, an electrical storage element 56B, a data memory storage interface module (DMSI) 66, an internal memory module (IMM) 68, and one or more user detectable signal generation modules 58B. The interface 152B may be any electronic interface that can communicate at least power including a USB interface 540A. The interface 152B may also enable communication of data and power between the EDPDC apparatus 520A and the electronic device 130 including with the IMM 68 and DMSI 66. The EDPDC apparatus 140B is similar to EDPDC apparatus 520B other than the device specific interface 152. In an embodiment the device specific interface 152B may receive an electrical signal 62B from the switch 54B and communicate the electrical signal on the appropriate contacts of the device specific interface 152B with provide DC electrical power via an electrical coupling 164 to the DC powered device 130 device specific interface 132. As noted the TMM 67A and the antenna 67B may enable the EDPDC apparatus 140B to communicate with an electronic device 30, 130, 230, 30A, 30B, 30C, 30D and base station 920 using a wired or wireless protocol FIG. 3A is a block diagram of another EDPDC architecture 200A according to various embodiments. The DC powered device 230 in the architecture 200A may have a device specific power supply interface 232. The EDPDC apparatus 240A may include an Alternating Current (AC) or DC electrical power coupling 42A, transformer/inverter 44A, a switch controller module 46A, a charging module 48A, a device specific interface 252A, a multiple position switch 54A, an electrical storage element 56A, a EDPDC apparatus interface 550 (for 500A) a data memory storage interface module (DMSI) 66, an internal memory module (IMM) 68, a TMM 67A, an antenna 67B, and one or more user detectable signal generation modules 58A. The interface 252A may be any electronic interface that can communicate at least power including a USB interface 540A. The interface 252A may also enable communication of data between the EDPDC apparatus 240A and the electronic device 230 including with the IMM 68 and DMSI 66. The EDPDC apparatus 240 is similar to EDPDC apparatus 40, 140 other than the device specific interface 252A. In an embodiment the device specific interface 252 may communicate an electrical signal 62 from the switch 54 via the appropriate contacts of the device specific interface 252 directly with the device specific interface 232 of the DC powered device 230. In an embodiment the EDPDC apparatus 240A device specific interface 252A may be one of a male or female based electrical contact interface and the DC powered device 230 device specific interface 232 may be one of a female or male based electrical contact interface, respectively. As noted the TMM 67A and the antenna 67B may enable the EDPDC apparatus 240A to communicate with an electronic device 30, 130, 230, 30A, 30B, 30C, 30D and base station 920 using a wired or wireless protocol.

Figure 3B:
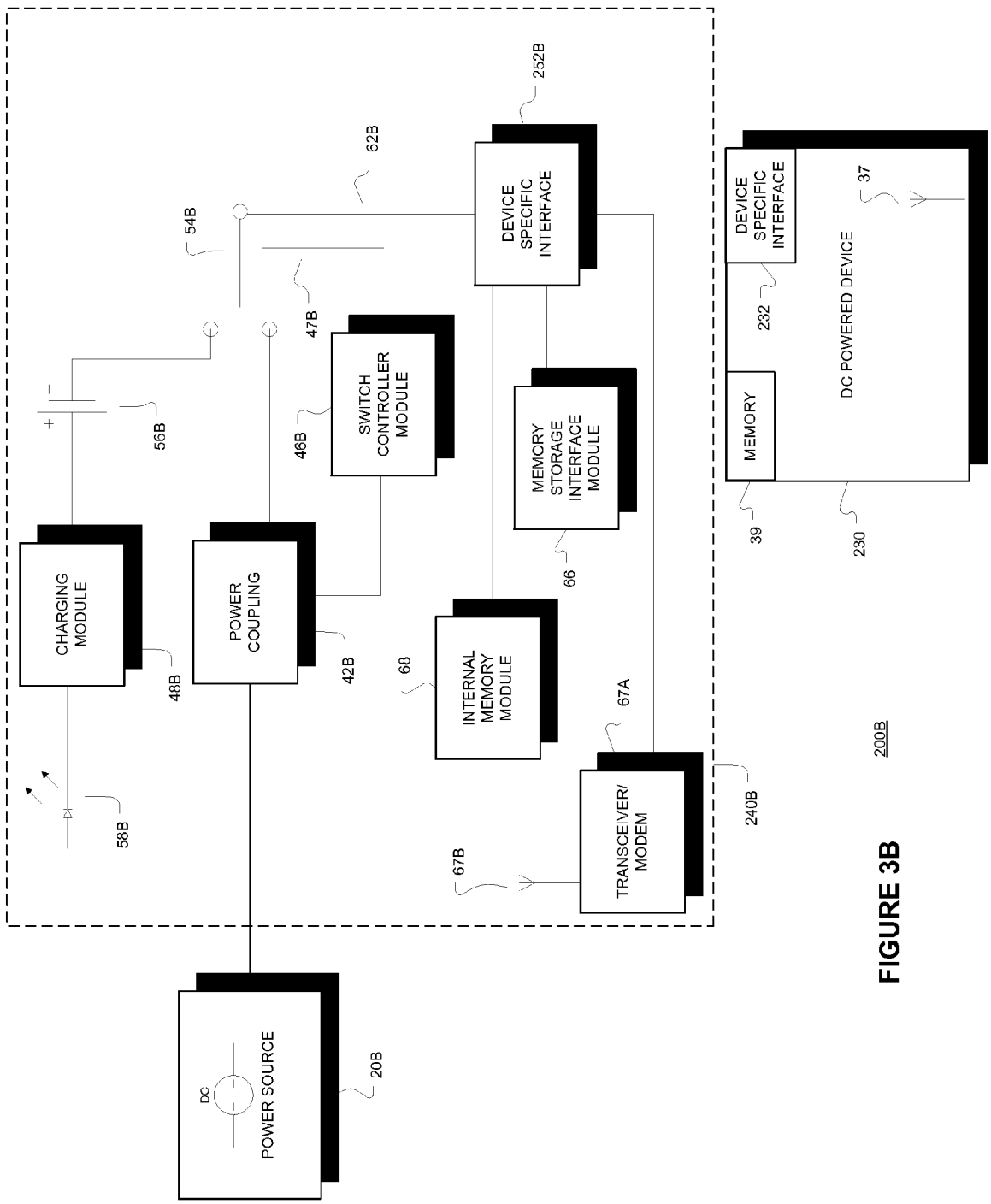
FIG. 3B is a block diagram of an architecture including a second electronic device power and data communication element according to various embodiments.
Figure 4A:
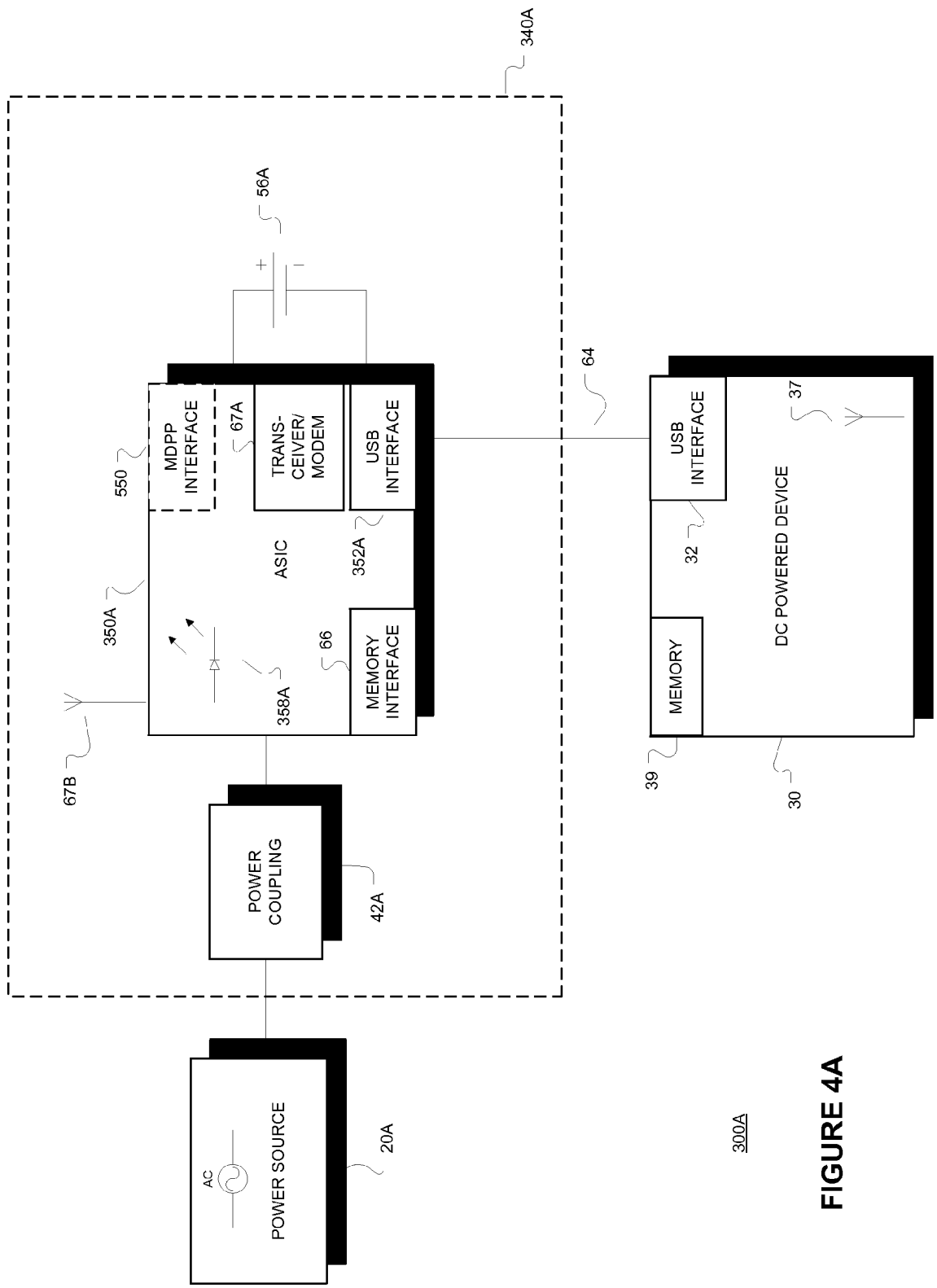
FIG. 4A is a block diagram of an architecture including a first electronic device power and data communication element according to various embodiments.

FIG. 3B is a block diagram of another EDPDC architecture 200B according to various embodiments. The DC powered device 230 in the architecture 200B may have a device specific power supply interface 232. The EDPDC apparatus 240B may include an electrical power coupling 42B, a switch controller module 46B, a charging module 48B, a device specific interface 252B, a multiple position switch 54B, an electrical storage element 56B, a data memory storage interface module (DMSI) 66, an internal memory module (IMM) 68, a TMM 67A, an antenna 67B, and one or more user detectable signal generation modules 58A. The interface 252B may be any electronic interface that can communicate at least power including a USB interface 540A. The interface 252B may also enable communication of data between the EDPDC apparatus 240B and the electronic device 230 including with the IMM 68 and DMSI 66. The EDPDC apparatus 240 is similar to EDPDC apparatus 40, 140 other than the device specific interface 252. In an embodiment, the device specific interface 252 may communicate an electrical signal 62B from the switch 54B via the appropriate contacts of the device specific interface 252B directly with the device specific interface 232 of the DC powered device 230. In an embodiment the EDPDC apparatus 240B device specific interface 252A may be one of a male or female based electrical contact interface and the DC powered device 230 device specific interface 232 may be one of a female or male based electrical contact interface, respectively. As noted the TMM 67A and the antenna 67B may enable the EDPDC apparatus 240B to communicate with an electronic device 30, 130, 230, 30A, 30B, 30C, 30D and base station 920 using a wired or wireless protocol FIG. 4A is a block diagram of another EDPDC architecture 300A according to various embodiments. The DC powered device 30 in the architecture 300A may have a USB interface 32 or device specific interface 232, 132. The EDPDC apparatus 340A may include an Alternating Current (AC) or DC electrical power coupling 42A, an Application Specific Integrated Circuit (ASIC) 350A, an antenna 67B, and an electrical storage element 56A. The ASIC 350A may include a data memory storage interface module (DMSI) 66, an internal memory module (IMM) 68, the TMM 67A and one or more user detectable signal generation modules 358A as part of or coupled to the ASIC 350A. The interface 352A may be any electronic interface that can communicate at least power. The interface 352A may also enable communication of data between the EDPDC apparatus 340A and the electronic device 30 including with the IMM 68 and DMSI 66. The ASIC 350A may perform the functions of the transformer/inverter 44A, switch controller module 46A, charging module 48A, a USB interface 52A, the TMM 67A, and a multiple position switch 54A. In an embodiment the EDPDC apparatus USB interface 352A may be one of a male or female based electrical contact interface and the DC powered device 30 USB interface 32 may be one of a female or male USB interface, respectively.

In embodiment the EDPDC apparatus 340A ASIC 350A may receive an electrical signals from the AC/DC power coupling 42A, ED 30, and the electrical storage element 56A. The ASIC 350A may determine whether the electrical signal provided by the AC/DC power coupling 42A is sufficient to provide power one or more DC powered device(s) 30 and may direct energy from the electrical storage element 56A alone in combination with the AC/DC coupling electrical signal (if present and insufficient) to provide an electrical signal on an USB interface 352A built into the ASIC 350A. An electrical cable 64 may couple the ASIC 350A USB interface 352A to the DC powered device 30 USB interface 32. The ASIC 350A may also control the charging of the electrical storage element 56A when sufficient electrical energy is provided by the AC/DC coupling 42A (or by the ED 30 in an embodiment). The ASIC 350A may include an EDPDC apparatus interface 550 (in 500A) where the second EDPDC apparatus 550 power coupling 42B may be coupled to the EDPDC apparatus interface 550.

The ASIC 350A may further transform or invert the electrical energy provided by the AC/DC coupling 42A to the DC voltage/amperage rating needed to charge the electrical storage element 56A and provide power to the DC powered device 30. The ASIC 350A via one or more user detectable signal generation modules 358A may inform a user when the electrical storage element 56A is being charged, discharged, external power is present, and when one or more DC powered devices 30 are electrically coupled to the EDPDC apparatus 340A. In an embodiment a user detectable signal generation module 58, 358, 558 may include one or more light emitting diodes (LEDs), other light generation devices, vibration modules, or audible generation devices (speakers). As noted the TMM 67A and the antenna 67B may enable the EDPDC apparatus 340A to communicate with an electronic device 30, 130, 230, 30A, 30B, 30C, 30D and base station 920 using a wired or wireless protocol. In an embodiment the ASIC 350A may enable the electrical storage element 56A to be charged from energy received from the ED 30 and provide electrical energy from the element 56A to the ED 30 and thus enable communication of energy between the ED 30 and EDPDC 340A.

Figure 4B:
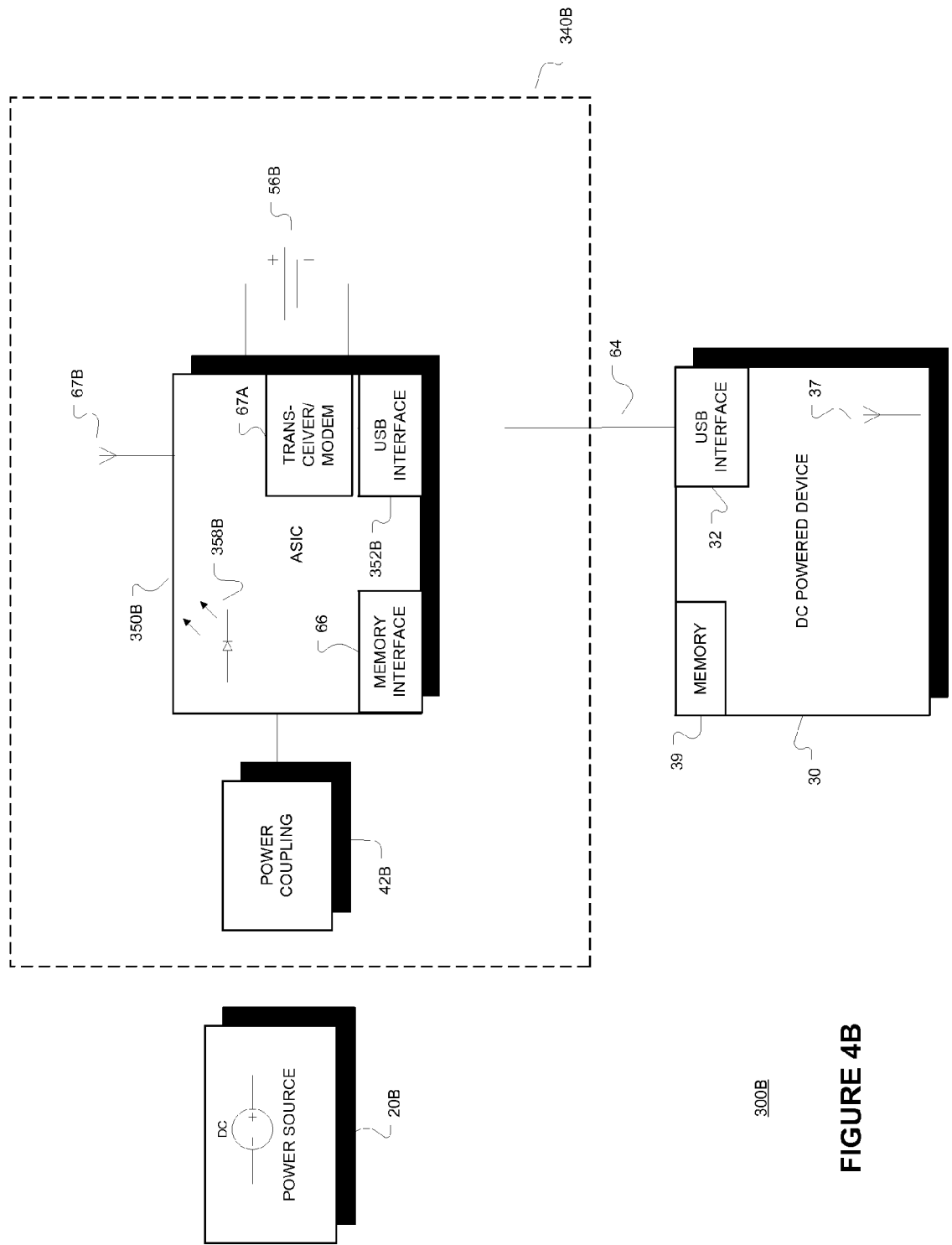
FIG. 4B is a block diagram of an architecture including a second electronic device power and data communication element according to various embodiments.

FIG. 4B is a block diagram of another EDPDC architecture 340B according to various embodiments. The DC powered device 30 in the architecture 340B may have a USB interface 32 or device specific interface 232, 132. The EDPDC apparatus 340B may include an Alternating Current (AC) or DC electrical power coupling 42B, an Application Specific Integrated Circuit (ASIC) 350B, an antenna 67B, and an electrical storage element 56B. The ASIC 350A may include a data memory storage interface module (DMSI) 66, an internal memory module (IMM) 68, an TMM 67A, and one or more user detectable signal generation modules 358A as part of or coupled to the ASIC 350B. The interface 352B may be any electronic interface that can communicate at least power. The interface 352B may also enable communication of data between the EDPDC apparatus 340B and the electronic device 30 including with the IMM 68 and DMSI 66. The ASIC 350B may perform the functions of the switch controller module 46B, charging module 48B, a USB interface 52B, and a multiple position switch 54B. In an embodiment the EDPDC apparatus USB interface 352B may be one of a male or female based electrical contact interface and the DC powered device 30 USB interface 32 may be one of a female or male USB interface, respectively.

In embodiment the EDPDC apparatus 340B ASIC 350B may receive an electrical signal from the AC/DC power coupling 42B and the electrical storage element 56B. The ASIC 350B may determine whether the electrical signal provided by the AC/DC power coupling 42B is sufficient to provide power one or more DC powered device(s) 30 and may direct energy from the electrical storage element 56B alone in combination with the AC/DC coupling electrical signal (if present and insufficient) to provide an electrical signal on an USB interface 352B built into the ASIC 350B. An electrical cable 64 may couple the ASIC 350B USB interface 352B to the DC powered device 30 USB interface 32. The ASIC 350B may also control the charging of the electrical storage element 56B when sufficient electrical energy is provided by the AC/DC coupling 42B.

The ASIC 350B may further transform or invert the electrical energy provided by the AC/DC coupling 42B to the DC voltage/amperage rating needed to charge the electrical storage element 56B and provide power to the DC powered device 30. The ASIC 350B via one or more user detectable signal generation modules 358B may inform a user when the electrical storage element 56B is being charged, discharged, external power is present, and when one or more DC powered devices 30 are electrically coupled to the EDPDC apparatus 340B. As noted the TMM 67A and the antenna 67B may enable the EDPDC apparatus 340B to communicate with an electronic device 30, 130, 230, 30A, 30B, 30C, 30D and base station 920 using a wired or wireless protocol. The ASIC 350B may also receive power from an ED 30 where power may be sufficient to charge the electrical storage element 56B. Accordingly the EDPDC 340B may communicate power between the ED 30 and electrical storage element 56B.

Figure 5A:
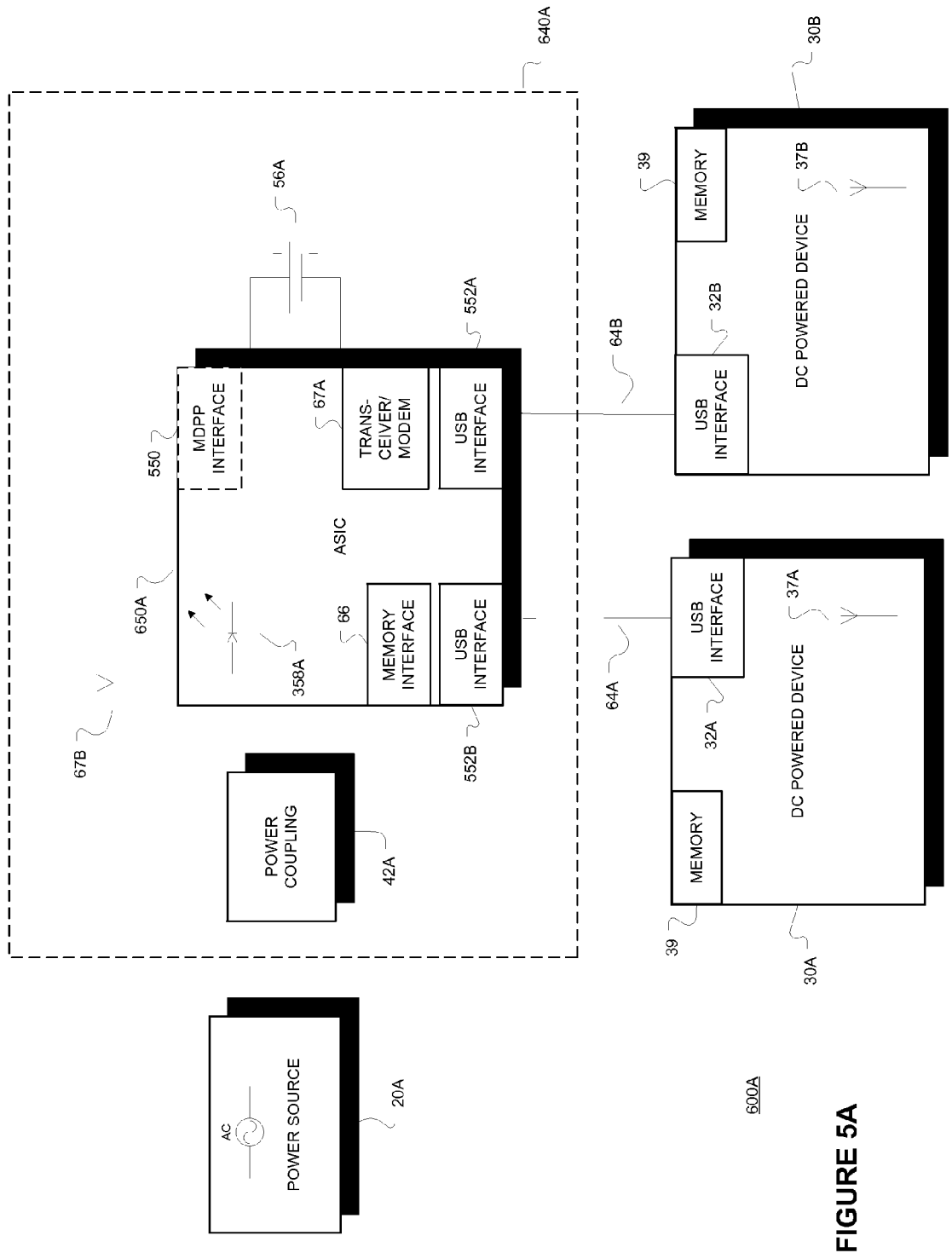
FIG. 5A is a block diagram of an architecture including a first electronic device power and data communication element according to various embodiments.

FIG. 5A is a block diagram of another EDPDC architecture 600A according to various embodiments. Multiple electrically powered devices 30A, 30B in the architecture 600A may have a USB interface 32A, 32B or device specific interface 232, 132. The EDPDC apparatus 640A may include an Alternating Current (AC) or DC electrical power coupling 42A, an Application Specific Integrated Circuit (ASIC) 650A, an antenna 67B, and an electrical storage element 56A. The ASIC 650A may include a data memory storage interface module (DMSI) 66, an internal memory module (IMM) 68, a TMM 67A, and one or more user detectable signal generation modules 358A as part of or coupled to the ASIC 650A. The interfaces 552A, B may be any electronic interface that can communicate at least power. The interfaces 552A, B may also enable communication of data between the EDPDC apparatus 640A and the electronic devices 30A, B including with the IMM 68 and DMSI 66. In embodiment the EDPDC apparatus 640A ASIC 650A may receive an electrical signal from the AC/DC power coupling 42A and the electrical storage element 56A.

The ASIC 650A may determine whether the electrical signal provided by the AC/DC power coupling 42A is sufficient to provide power to the two or more DC powered device(s) 30A, 30B and may direct energy from the electrical storage element 56A alone in combination with the AC/DC power coupling 42A electrical signal (if present and insufficient) to provide an electrical signal on multiple USB interfaces 552A, 552B built into the ASIC 650A. Electrical cables 64A, 64B may couple the ASIC 650A USB interfaces 552A, 552B to the DC powered device 30A, 30B USB interfaces 32A, 32B. The ASIC 650A may also control the charging of the electrical storage element 56A when sufficient electrical energy is provided by the AC/DC power coupling 42A. As noted the TMM 67A and the antenna 67B may enable the EDPDC apparatus 640A to communicate with an electronic device 30, 130, 230, 30A, 30B, 30C, 30D and base station 920 using a wired or wireless protocol. In an embodiment the EDPDC apparatus 640A may also receive power from the ED 30A, 30B where the power may be sufficient to operate the EDPDC apparatus 640A or charge the electrical storage element 56A. The EDPDC apparatus 640A may also enable the passage of power from one ED 30A to another ED 30B. Accordingly in an embodiment, the EDPDC apparatus 640A may enable communication of power of between the ED 30A, ED 30B, and itself.

Figure 5B:
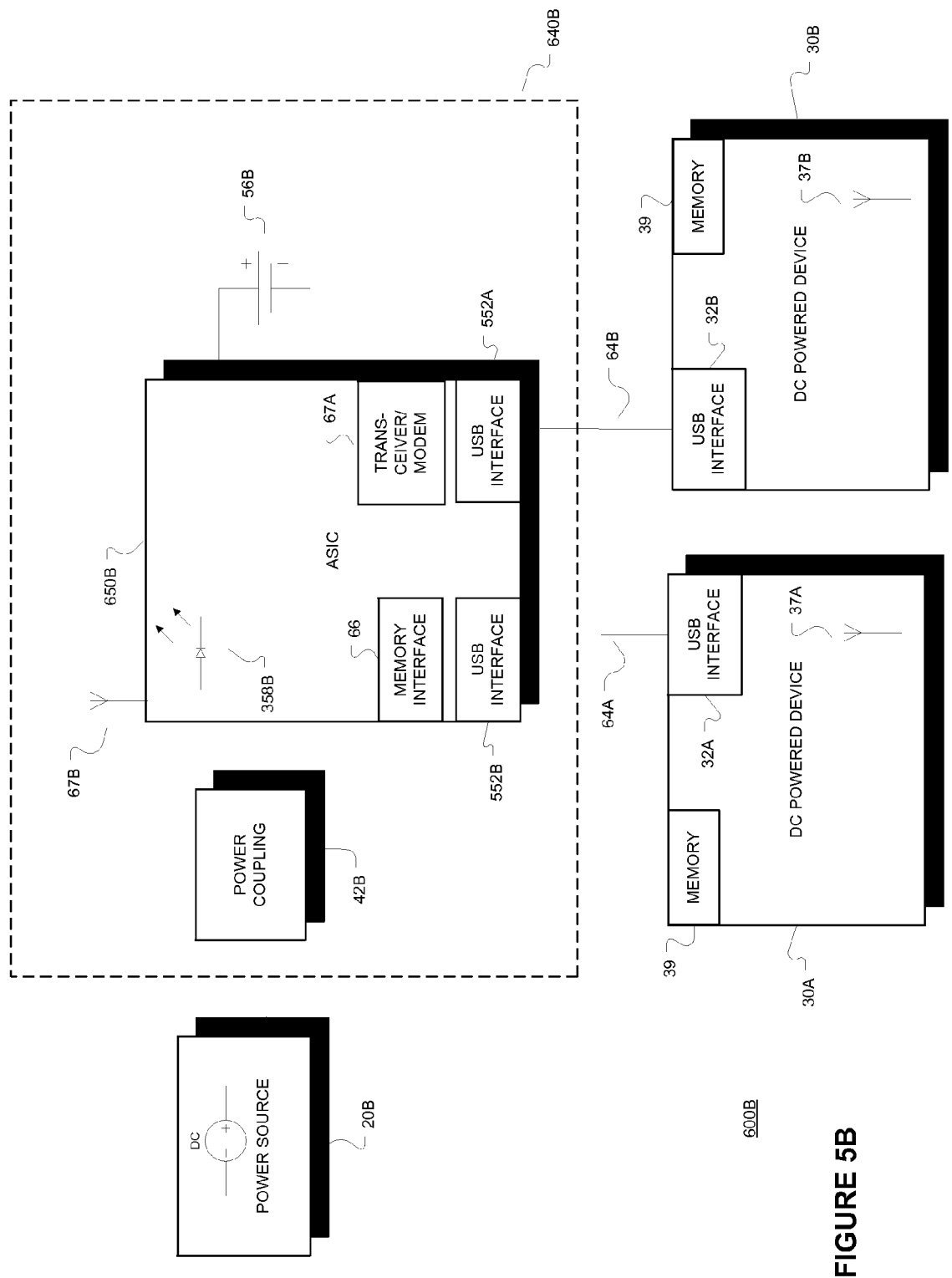
FIG. 5B is a block diagram of an architecture including a second electronic device power and data communication element according to various embodiments.

FIG. 5B is a block diagram of another EDPDC architecture 600B according to various embodiments. Multiple DC powered devices 30A, 30B in the architecture 600B may have a USB interface 32A, 32B or device specific interface 232, 132. The EDPDC apparatus 640B may include an Alternating Current (AC) or DC electrical power coupling 42B, an Application Specific Integrated Circuit (ASIC) 650B, an antenna 67B, and an electrical storage element 56B. The ASIC 650B may include a data memory storage interface module (DMSI) 66, an internal memory module (IMM) 68, a TMM 67A, and one or more user detectable signal generation modules 358B as part of or coupled to the ASIC 650B. The interfaces 552A, B may be any electronic interface that can communicate at least power. The interfaces 552A, B may also enable communication of data between the EDPDC apparatus 640A and the electronic devices 30A, B including with the IMM 68 and DMSI 66 In embodiment the EDPDC apparatus 640B ASIC 650B may receive an electrical signal from the AC/DC electric power coupling 42B and the electrical storage element 56B.

The ASIC 650B may determine whether the electrical signal provided by the AC/DC power coupling 42B is sufficient to provide power to the two or more DC powered device(s) 30A, 30B and may direct energy from the electrical storage element 56B alone in combination with the AC/DC power coupling 42B electrical signal (if present and insufficient) to provide an electrical signal on multiple USB interfaces 552A, 552B built into the ASIC 650B. Electrical cables 64A, 64B may couple the ASIC 650B USB interfaces 552A, 552B to the DC powered device 30A, 30B USB interfaces 32A, 32B. The ASIC 650B may also control the charging of the electrical storage element 56B when sufficient electrical energy is provided by the AC/DC power coupling 42B. As noted the TMM 67A and the antenna 67B may enable the EDPDC apparatus 640B to communicate with an electronic device 30, 130, 230, 30A, 30B, 30C, 30D and base station 920 using a wired or wireless protocol. In an embodiment the EDPDC apparatus 640B may also receive power from the ED 30A, 30B where the power may be sufficient to operate the EDPDC apparatus 640B or charge the electrical storage element 56B. The EDPDC apparatus 640A may also enable the passage of power from one ED 30A to another ED 30B. Accordingly in an embodiment, the EDPDC apparatus 640B may enable communication of power of between the ED 30A, ED 30B, and itself.

Figure 6A:
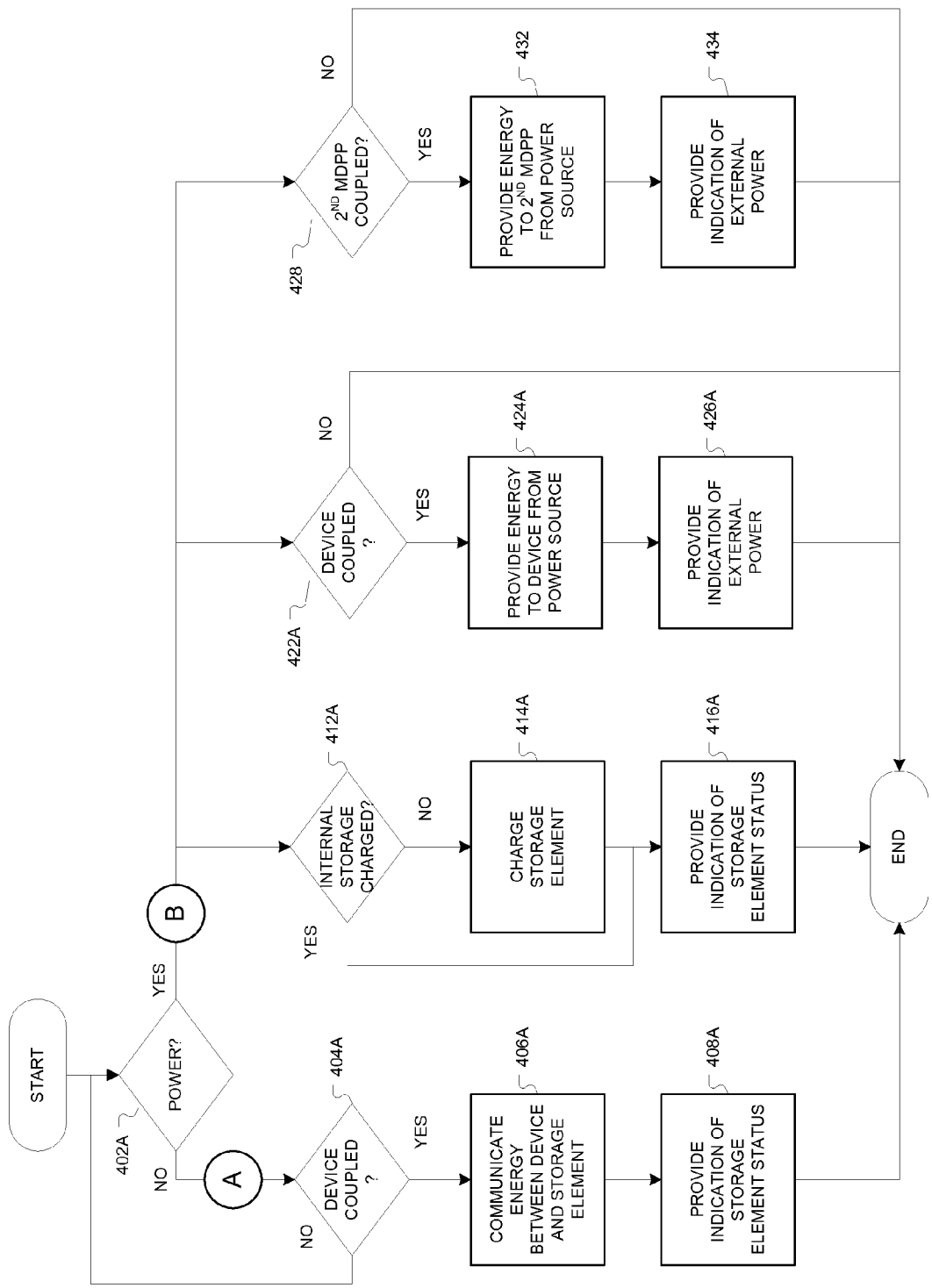

FIG. 6A is a flow diagram illustrating several methods 400A according to various embodiments. An ASIC 350A, 650A may employ the method 400A illustrated by the FIG. 6A flow diagram. The method 400A may determine whether sufficient power is being provided by an external power source 20A to power one or more devices 30, 130, 230, 30A, 30B (activity 402A). When the power is insufficient and at least one device is coupled to a EDPDC apparatus 340A, 640A, 700, 800, 900A to 900C (activity 404A), the method 400A may communicate energy between the one or more devices 30, 30A, 30B and an electrical storage element 56A (activity 406A) and provide an indication of the electrical storage element 56A discharge or charge status via the user detectable signal generation device 358A (activity 406A, 408A). As noted, an EDPDC apparatus 500A, 500B, 520A, 520B, 140A, 140B, 240A, 240B, 340A, 340B, 640A, 640B, 700, 800, 900A to 900C may provide power to a coupled ED 30, 30A to 30D, 130, 230 from an internal electrical storage element 56A, 56B and receive power from an ED 30, 30A to 30D, 130, 230 to charge an internal electrical storage element 56A, 56B.

When sufficient power is provided by the external power source 20A and the electrical storage device 56A is not fully charged (activity 412A) the method 400A may charge the electrical storage element 56A (activity 414A) and provide an indication of the electrical storage element 56A charge level via the user detectable signal generation device 358A (activity 416A). Further when sufficient power is provided by the external power source 20A (activity 402A) and at least one device 30, 30A, 30B is coupled to the EDPDC apparatus 340, 540 (activity 422A) the method 400A may provide energy to the one or more devices 30, 30A, 30B from the external power source 20A (activity 424A) and provide an indication of the existence of power from the external power source 20A via the user detectable signal generation device 358A (activity 426A).

Further when sufficient power is provided by the external power source 20A (activity 402A) and a second EDPDC apparatus 140B, 240B, 640B is coupled to the EDPDC apparatus 500A, 520A, 140A, 240A, 340A, 640A, 700, 800, 900A to 900C (activity 428) the method 400A may provide energy to the 2nd EDPDC apparatus 500B, 520B, 140B, 240B, 640B from the external power source 20A (activity 432) and provide an indication of the existence of power from the external power source 20A via the user detectable signal generation device 358A, 58A (activity 434).

Figure 6B:
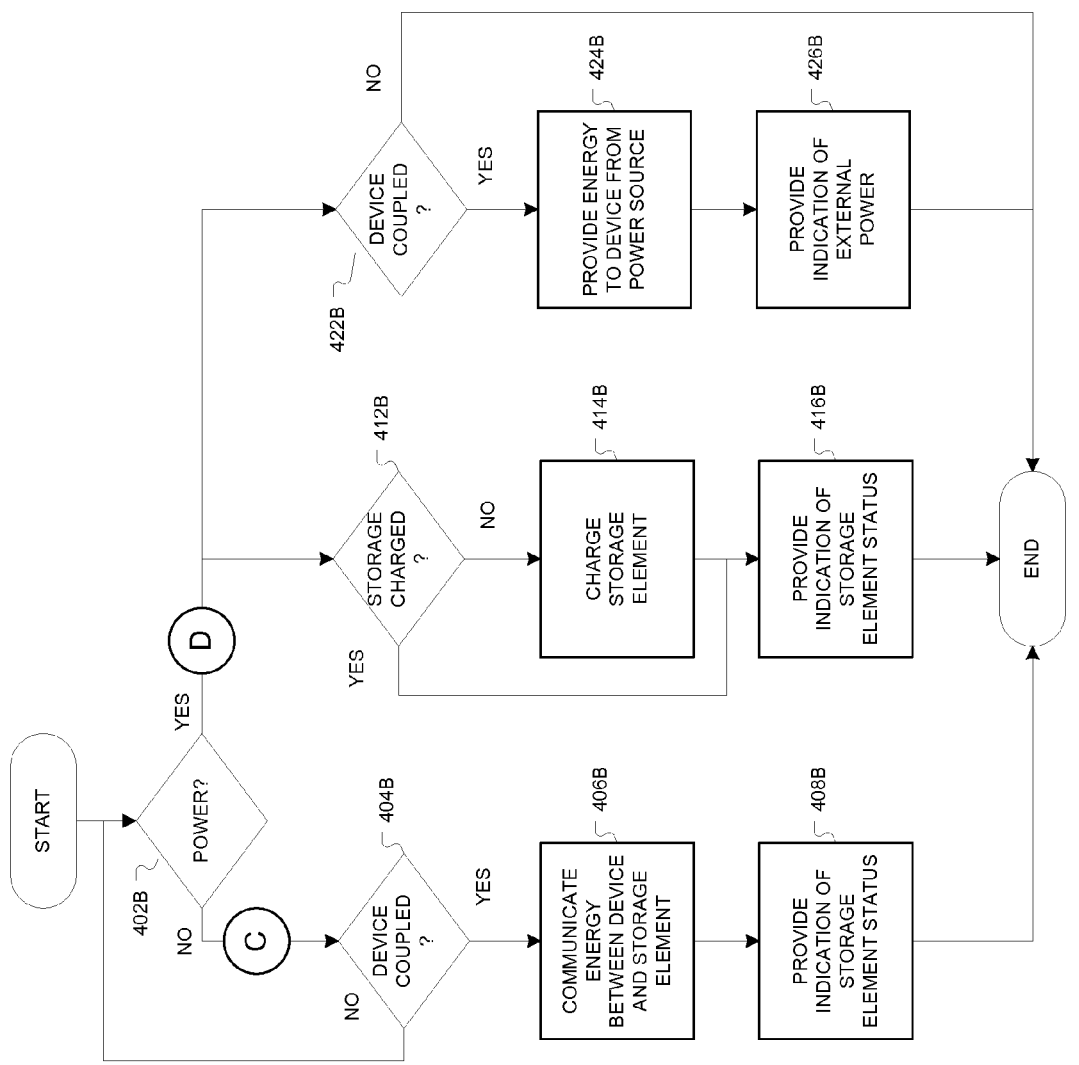

FIG. 6B is a flow diagram illustrating several methods 400B according to various embodiments. An ASIC 350B, 650B may employ the method 400B illustrated by the FIG. 6B flow diagram. The method 400B may determine whether sufficient power is being provided by an external power source 20B to power one or more devices 30, 130, 230, 30A to 30D (activity 402B). When the power is insufficient and at least one device is coupled to a EDPDC apparatus 340B, 640B (activity 404B), the method 400B may communicate energy between one or more devices 30, 130, 230, 30A to 30D and an electrical storage element 56B (activity 406B) and provide an indication of the electrical storage element 56B status via the user detectable signal generation device 358B (activity 406B, 408B). As noted, an EDPDC apparatus 500B, 520B, 140B, 240B, 340B, 640B, 700, 800, 900A to 900C may provide power to a coupled ED 30, 30A to 30D, 130, 230 from an internal electrical storage element 56B and receive power from an ED 30, 30A to 30D, 130, 230 to charge an internal electrical storage element 56B.

When sufficient power is provided by the external power source 20B and the electrical storage device 56B is not fully charged (activity 412B) the method 400B may charge the electrical storage element 56B (activity 414B) and provide an indication of the electrical storage element 56B charge level via the user detectable signal generation device 358B (activity 416B). Further when sufficient power is provided by the power source 2B0 (activity 402B) and at least one device 30, 30A, 30B is coupled to the EDPDC apparatus 340B, 640B (activity 422B) the method 400B may provide energy to the one or more devices 30, 30A, 30B from the external power source 20B (activity 424B) and provide an indication of the existence of power from the external power source 20B via the user detectable signal generation device 358B (activity 426B).

FIG. 6C is a flow diagram illustrating several methods 402A according to various embodiments. An ASIC 350A, 650A may employ the method 402A illustrated by the FIG. 6C flow diagram. The method 402A shown in FIG. 6C may be employed by the ASIC 350A, 650A in an embodiment to reduce energy consumption when a device 30, 30A to 30D, 130, 230 is not connected. The method 402A may set a sleep timer to a predetermined level (or time) (activity 440A). The method 402A may determine whether adequate external power is provided to the ASIC 350A, 650A (activity 442A) and may transfer control to section A of FIG. 6A when inadequate power is available. When adequate external power is detected, the method may determine whether a device 30, 30A to 30D, 130, 230 is coupled to the ASIC 350A, 650A or second EDPDC apparatus 520B, 140B, 240B, 340B, or 640B is coupled to the EDPDC apparatus 340A, 640A including the ASIC 350A, 650A (activities 444A and 446A).

When a device 30, 30A to 30D, 130, 230 is coupled to the ASIC 350A, 650A or second EDPDC apparatus 520B, 140B, 240B, 340B, or 640B is coupled to the EDPDC apparatus 340A, 640A including the ASIC 350A, 650A, control may be transferred to section B of FIG. 6A. Otherwise the method 402A may determine whether a predetermined time interval has passed (sleep timer equal to zero) activity 448A. When the time interval has not passed then an external power source may be decoupled (activity 454A) to reduce un-necessary power consumption. When the predetermined time interval has passed (sleep timer zero), the method 402A may determine whether the storage element 56A, 56B needs charging by comparing its storage level to a predetermined level or percentage of total capacity (activity 452A). When the internal level is less than the predetermined level or percentage, the method 402A may charge the storage element (activity 414C). The method 402A may then decouple the external power source (activity 454A) to save un-necessary power consumption and reset the sleep timer to the predetermined level or time (activity 440A).

FIG. 6D is a flow diagram illustrating several methods 402B according to various embodiments. An ASIC 350B, 650B may employ the method 402B illustrated by the FIG. 6D flow diagram. The method 402B shown in FIG. 6D may be employed by the ASIC 350B, 650B in an embodiment to reduce energy consumption when a device is not connected. The method 402B may set a sleep timer to a predetermined level or time (activity 440B). The method 402B determine whether adequate external power is provided to the EDPDC apparatus 340B, 640B (activity 442B) and may transfer control to section C of FIG. 6B when inadequate power is available or detected. When adequate external power is detected, the method may determine whether a device 30, 130, 230, 30A to 30D is coupled to the EDPDC apparatus 340B, 640B (activity 444B).

When a device 30, 130, 230, 30A to 30D is coupled to the EDPDC apparatus 340B, 640B, control may be transferred to section D of FIG. 6B. Otherwise the method 402B may determine whether a predetermined time interval has passed (sleep timer zero) activity 448B. When the time interval has not passed then the external power source may be decoupled (activity 454B) to reduce un-necessary power consumption. When the predetermined time interval has passed (sleep timer zero), the method 402B may determine whether the storage element 56A, 56B needs charging by comparing its storage level to a predetermined level or percentage of total capacity (activity 452B). When the storage element 56A, 56B internal level is less than the predetermined level or percentage, the method 402B may charge the storage element (activity 414C). The method 402B may then decouple the external power source (activity 454B) to reduce un-necessary power consumption and reset the sleep timer to the predetermined level or time (activity 440B).

In method 402A and 402B the internal power element 56A, 56B may provide energy to the EDPDC apparatus 340A, 340B, 640A, 640B when the external power is optionally decoupled. In an embodiment when the storage element 56A, 56B is depleted to a predetermined percentage X (activity 452A, 452B) the external power may be engaged to charge the storage element 56A, 56B (activity 414C). In an embodiment the predetermined percentage X may range from about 95% to 80%.

FIG. 6E is a flow diagram illustrating several methods 414 according to various embodiments. An ASIC 350A, 650A or system 500A, 10A, 10B, 140A, 140B, 300A, 300B may employ the method 414 illustrated by the FIG. 6E flow diagram. The method 414 shown in FIG. 6E may be employed by the methods 400A, 400B in an embodiment to optimize storage element 56A, 56B charging. In the method 414 a storage element 56A, 56B may not be charged when the determined energy level is greater than X percentage (activity 460). The method 414 may fast charge the storage element 56A, 56B when the determined level is less than Y % (activity 462, 464). The method 414 may slow or trickle charge the storage element 56A, 56B when storage level is greater than Y % and less than X % (activity 462, 466). In an embodiment X may be about 95% of maximum storage capacity and Y may be about 80% of maximum storage capacity.

Figure 7:
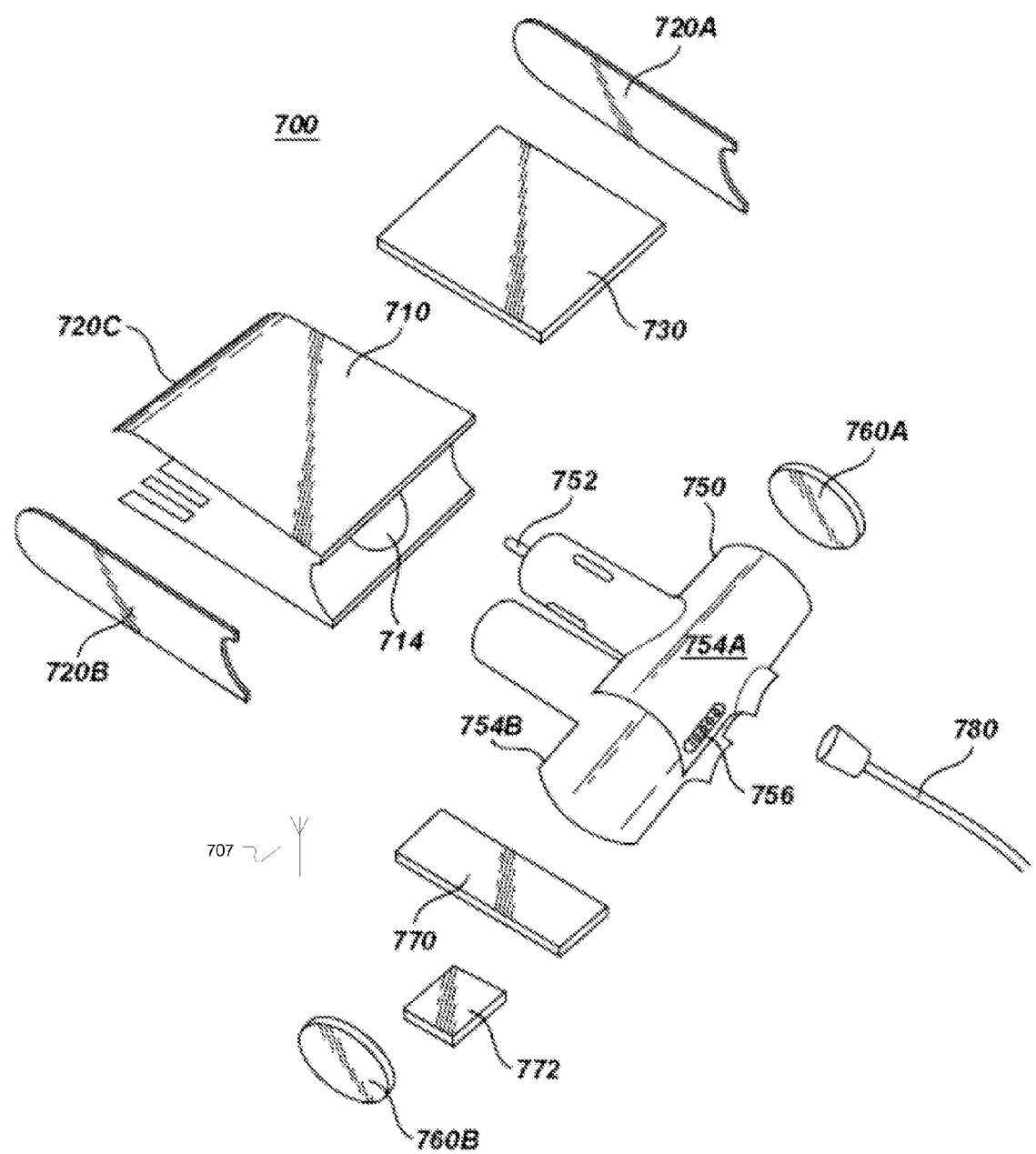
FIG. 7 is an exploded view of an architecture including a first and a second electronic device power and data communication element according to various embodiments.

FIG. 7 is a block diagram of architecture 700 including a first and a second mobile device power supply element according to various embodiments. The architecture 700 may include a first MDPP 710 and a second MDPP 750. The first MDPP 710 may have a housing 720C including a right 720A and a left 720B side cap and a recess 714. The first MDPP 710 may include a circuit board 730 that functions as an ASIC 650A, 350A. The second MDPP 750 may also include a circuit board 770, user detectable devices 756, upper housing 754A, lower housing 754B, power interface 752, battery 772, right 760A and left 760B side cap. The circuit board 770 may function as an ASIC 650B, 350B. The power interface 752 may function as power coupling 20B. The user detectable devices 756 may function as a user detectable device 358B, 58B. The second MDPP 750 power interface 752 may fit in the first MDPP 710 recess 714. A wire 780 may be coupled to the MDPP 710, 750 to provide power or couple a MDPP 710, 750 to a mobile device 30, 30A, 30B.

Figure 8:
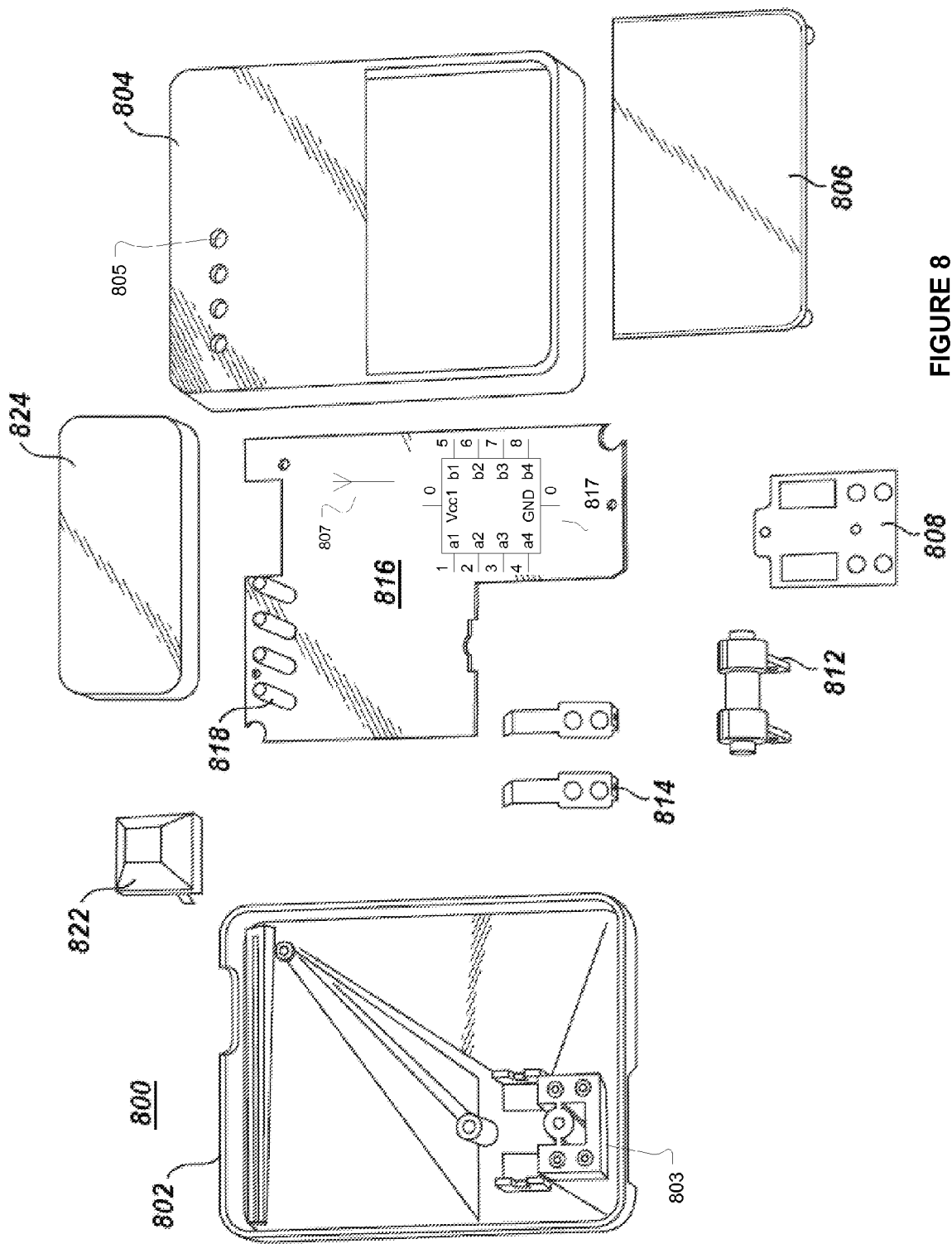
FIG. 8 is an exploded view of an architecture including an electronic device power and data communication element according to various embodiments.

FIG. 8 is an exploded diagram of an EDPDC apparatus 800 according to various embodiments. The EDPDC apparatus 800 may be employed in various embodiments including EDPDC apparatus 500A, 520A, 140A, 240A, 340A, 640A. In an embodiment EDPDC apparatus 800 may include a back body 802, a front body 804, a battery cover 806, electrical power source contacts 812, spring prongs 814, a contact plate 808, a circuit board 816, a universal serial bus (USB) module 822, an antenna 807, and a battery pack 824. The circuit board 816 may include one or more LEDs 818 and a processor 817. The processor 817 may function as ASIC 650A, 350A. The back cover 802 may include an electrical prong module holder 803. The electrical contacts 812, spring prongs 814, and contact plate 808 may form a prong module and the prong module may be coupled to the prong module holder 803. The USB module 822 may be coupled to the circuit board 816. The front cover 804 may have one or more openings 805 for the LEDs 818. The battery 824 may be coupled to the circuit board 816 and may be located under the battery cover 806. In an embodiment the battery cover 806 may be removable so the battery 824 may be replaced.

Figure 9B:
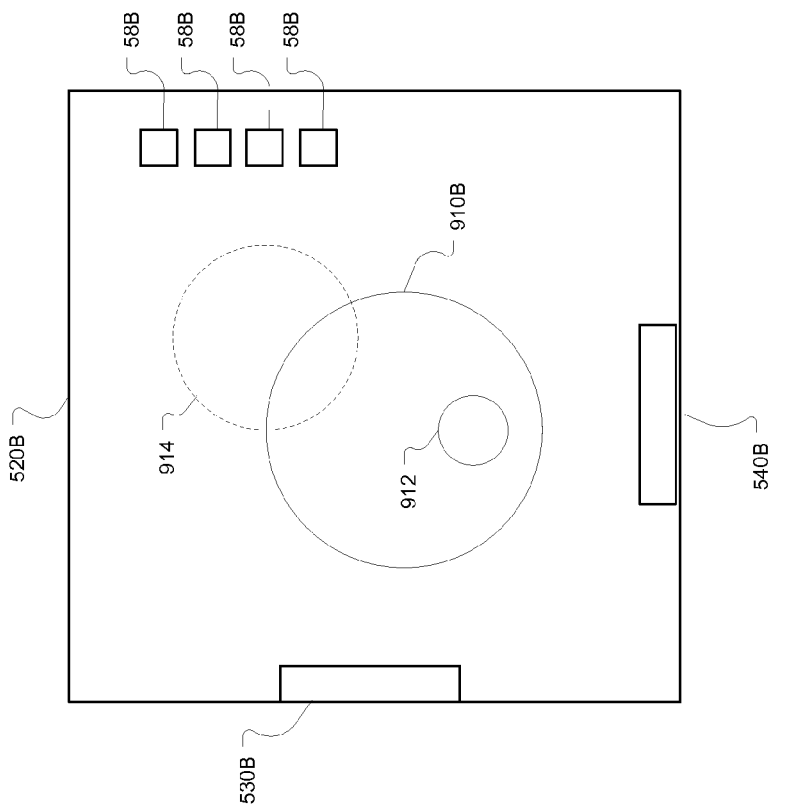
FIG. 9B is a front view of a simplified diagram of another electronic device power and data communication apparatus according to various embodiments.
Figure 9A:
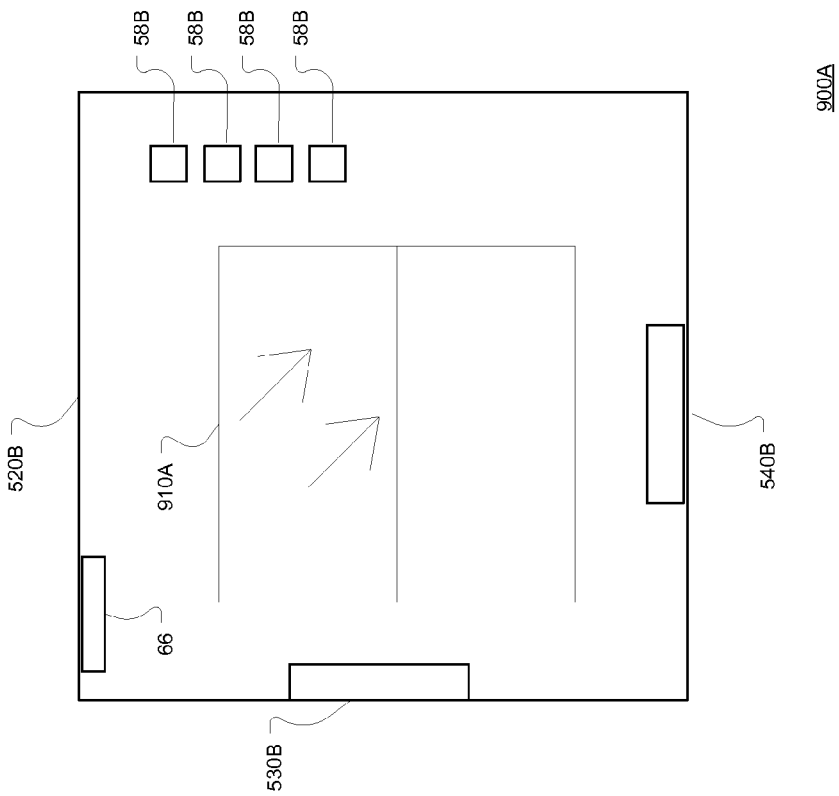
FIG. 9A is a front view of a simplified diagram of an electronic device power and data communication apparatus according to various embodiments.

FIG. 9A is a front view of a simplified diagram of an EDPDC apparatus 900A according to various embodiments. The EDPDC apparatus 900A may include EDPDC apparatus 500A, 520A, 140A, 240A, 340A, 640A and a solar panel 910A. The solar panel 910A may be coupled to an EDPDC apparatus 500A, 520A, 140A, 240A, 340A, 640A and provide another energy or power source.

FIG. 9B is a front view of a simplified diagram of an EDPDC apparatus 900B according to various embodiments. The EDPDC apparatus 900B may include EDPDC apparatus 500A, 520A, 140A, 240A, 340A, 640A and a hand crank electrical generator 910B. The hand crank electrical generator 910B may include a crank 912 and electrical generator 914 coupled to the crank 912. The electrical generator 914 may be coupled to EDPDC apparatus 500A, 520A, 140A, 240A, 340A, 640A and provide another energy source. The electrical generator 914 may be a magnetic induction charging generator 914 in an embodiment.

FIGS. 11A, 11B, and 11C are isometric diagrams of an EDPDC apparatus 900C according to various embodiments. As shown in FIGS. 11A, 11B, and 11C, architecture 900C may include a first electrical power source connector 930A, a second electrical power source connector 932A, a first data and power electrical connector 940A (FIG. 11C), a second data and power electrical connector 942A, a data device connector 944A, a user detectable module 958A, and a user input module 958B. In an embodiment the first electrical power connector 930A may include one or more prongs or male connectors 930C and a tab 930B for exposing the prongs at various angles relative to its seated/stored position (as shown in FIG. 11B) to about 180 degrees (in an embodiment). The first electrical power connector 930A may be coupled to an external power supply including an on-grid AC power source.

In an embodiment the second electrical power connector 932A may include a single prong with electric contacts 932C, 932D (FIG. 11D) and a tab 932B for exposing or rotating the prong at various angles relative to its seated/stored position (as shown in FIG. 11B) to about 180 degrees (in an embodiment). The second electrical power connector 932A may be coupled to an external power supply including a DC power source (such as a car lighter accessory). The electric contacts 932C, 932D may be coupled to positive and negative contacts of an external DC power source.

The first data and power electrical connector 940A may be a USB type connector or other data/power connector 940A configured to be coupled to a male data/power connector (in an embodiment). The second data and power electrical connector 942A may be a mini or micro USB type connector or other data/power connector 942A configured to be coupled to a female data connector (in an embodiment). In an embodiment, the electrical data/power connector 940A may include a slot 944A configured to receive a data module including a memory module. The memory module may be a SDHC module as described above. The slots 944A may also function as the alignment tab common in a USB female connector.

The slot 944A may include one or more electrical contacts that may mate with corresponding electrical contacts of a memory module upon insertion into the slot 944A. The user detectable module 958A may be a light based module (ring) in an embodiment. The light frequency (color) may vary as a function or the operation or state of architecture 900C. The user input module 958B may be a multi-function button in an embodiment. The module 958B may be able to control various functions of the architecture 900C as described above with reference to EDPDC apparatus 500A, 500B, 520A, 520B, 140A, 140B, 240A, 240B, 340A, 340B, 640A, and 604B. As shown in FIGS. 11A to 11C the casing 910B may include curved surfaces 910C, 910A, 910F. The casing 910B may also include recesses 910D, 910E to hold the second and first electrical power source connectors in a recessed and exposed positions, respectively. The casing 910B may also enable the second data connector 942B to be recessed in the case when not in use and flexibly and restorably extend from the case when in use. In particular the connector 942B male electrical connector 942C may be stored within the casing 910B.

FIG. 11D is an exposed diagram of an EDPDC apparatus with the case 910B removed according to various embodiments. FIG. 11D shows the spaced relationship of the first and second electrical power source connectors 930A, 932A, the first and second data/power connectors 942A, 940A, a main control module 950A, and the user detectable module 958A and the user input module 958B. In an embodiment the main control and electrical energy storage module 950A may include the elements of the modules 520A, 520B, 140A, 140B, 240A, 240B, 350A, 350B, 650A, and 650B. The module 950A may include a DMSI 66 that enables communication with a memory module inserted in the slot 944A.

FIG. 11E is a partial diagram of a data/power electrical connector 942A of an EDPDC apparatus 900C according to various embodiments. The data/power electrical connector 942A includes a deployment tab 942B and a male connector 942C with a flexible cable 942D. The connector 942A flexible cable 942D may enable the connector to be restorably removed and inserted into the apparatus 900C body 910B. In an embodiment the connector 942A may a mini or micro USB connector. In an embodiment the data/power connectors 940A and 942C may be used to communicate data and power with the main control and electrical energy storage module 950A. The connectors 940A and 942C may be receive power from an ED 30, 30A to 30D, 130, 230 where the power is used to charge the main control and electrical energy storage module 950A. The connectors 940A and 942C may be also provide power to an ED 30, 30A to 30D, 130, 230 where the power is used to charge or power the ED 30, 30A to 30D, 130, 230.

Figure 12C:
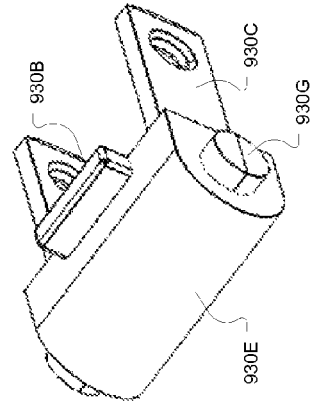
FIGS. 12A-12C are diagrams of an electrical power connector assembly and components of the apparatus according to various embodiments.
Figure 12B:
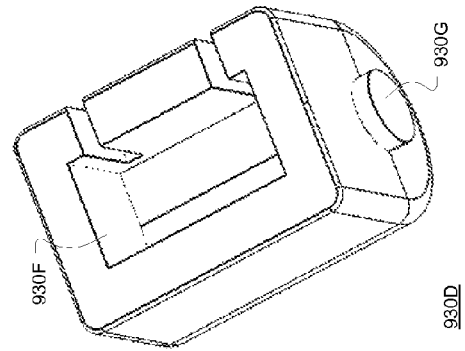
Figure 12A:
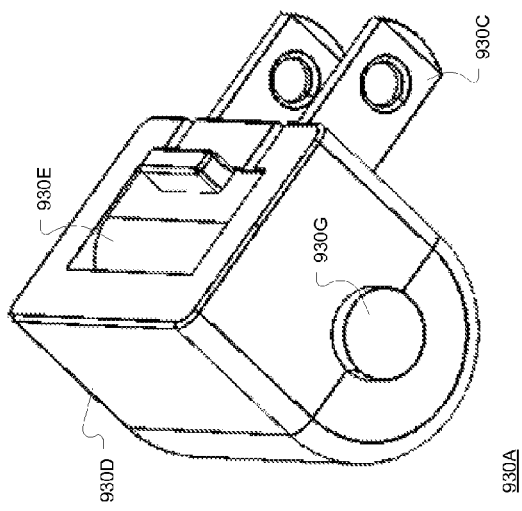

FIGS. 12A-12C are diagrams of an electrical power connector assembly 930A and components of the assembly 930A according to various embodiments. As shown in FIGS. 12A-12C, the electric power connector assembly 930A may include an outer, rotatable base 930D, an inner rotatable section 930E, and prongs 930C. The base 930D and section 930E may include one or more cams 930G. The inner rotatable section 930E may be nested in a recess 930F of the outer, rotatable base 930D. The recess 930F may include recesses for the inner rotatable section 930E cams 930G and slots for the prongs 930C.

In an embodiment the inner, rotatable section 930E may rotate about 90 degrees within the outer, rotatable base 930D recess 930F. EDPDC apparatus 900C casing 910B may include recesses for the outer, rotatable base 930D, its corresponding cam(s) 930G and the prongs 930C. The outer, rotatable base 930A may be rotated about 90 degrees within the casing 910B. Accordingly the prongs 930C may be rotated up to 180 degrees due the rotation capability of the inner, rotatable section 930E and the outer, rotatable base 930D. Such a configuration may enable coupling of the EDPDC apparatus 900C prongs 930C in limited space environments including a power strip via the deployment tab 930B.

Figure 13B:
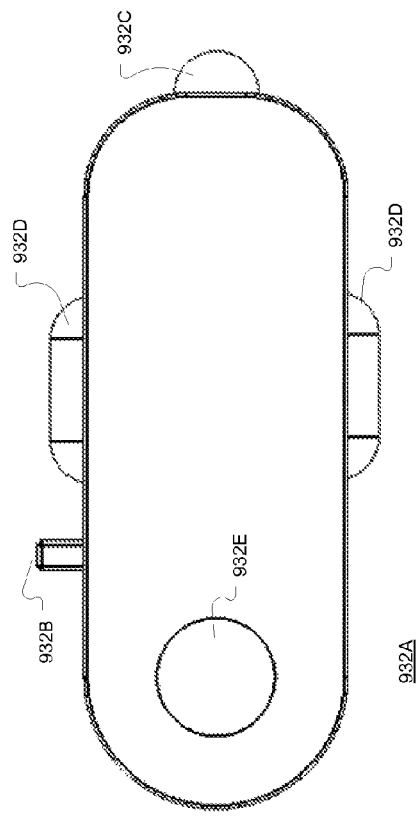
FIGS. 13A-13B are diagrams of another electrical power connector assembly of an electronic device power and data communication apparatus according to various embodiments.
Figure 13A:
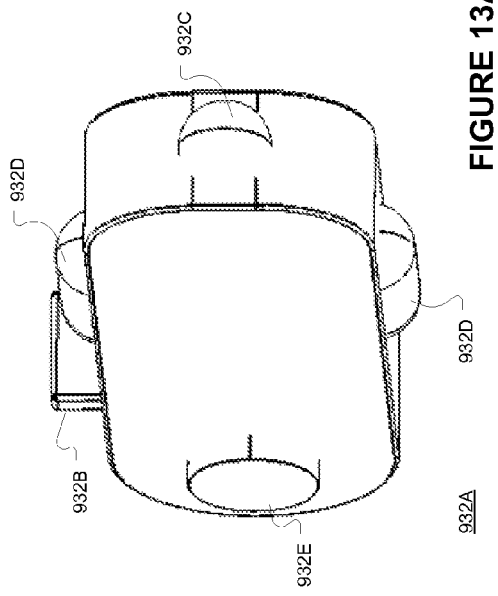

FIGS. 13A-13B are diagrams of the electrical power connector assembly 932A according to various embodiments. The connector assembly 932A may include electrical contacts 932D (on the side) and a contact 932C on the tip, deployment tab 932B, and cams 932E. The electrical contact 932C may be configured to be coupled to positive polarity and the contacts 932D may be coupled to a negative polarity of a DC electrical signal of a DC signal female accessory in an embodiment. EDPDC apparatus 900C casing 910B may include recesses for the connector 932A, its corresponding cam(s) 932E and contacts 932D, 932C. The connector 932C may be rotated up to 180 degrees due to its shape and casing 910B in an embodiment. Such a configuration may enable coupling of the EDPDC apparatus 900C connector 932A in limited space environments via the deployment tab 932B.

Figure 14:
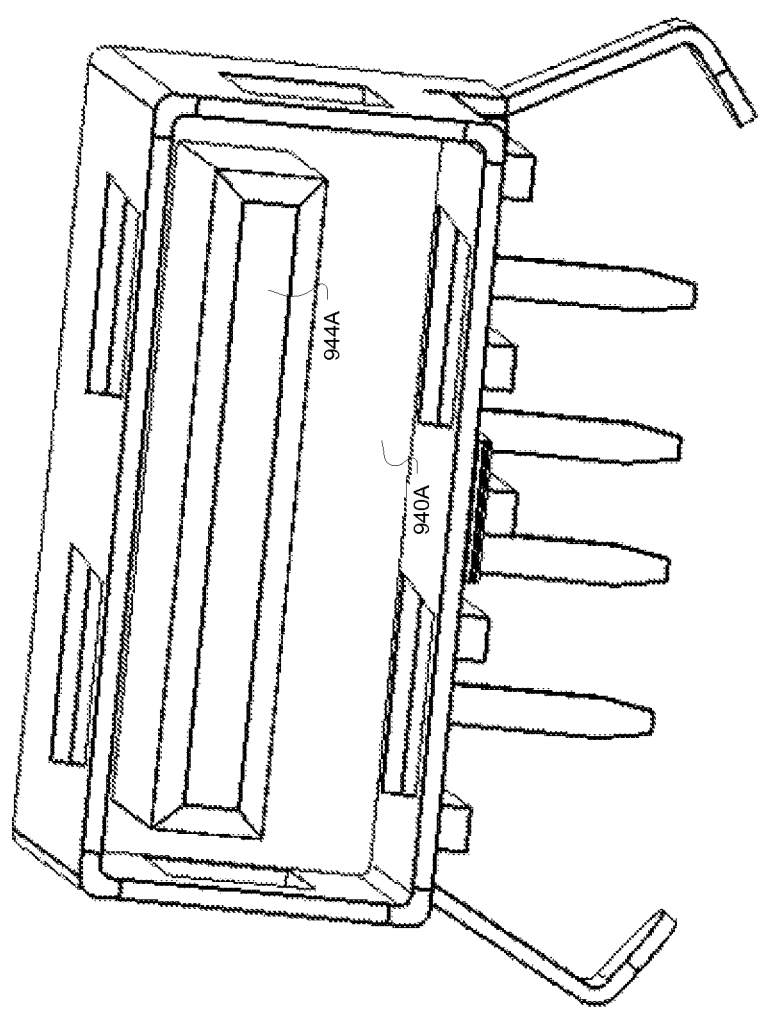
FIG. 14 is a partial diagram of an electrical connector of an electronic device power and data communication apparatus according to various embodiments.

FIG. 14 is a partial diagram of an electrical connector assembly 940A of an EDPDC apparatus 900C according to various embodiments. As noted the connector 940A may be a female USB connector. In place of the registration tab, the connector 940A may include a slotted tab 944A. The slotted tab 944A may be configured to enable a memory module or other sized electrical module to be inserted therein. The slot 944A may include one or more electrical contacts that communicate electrical signals between an inserted module and the controller module 950A.

Figure 15B:
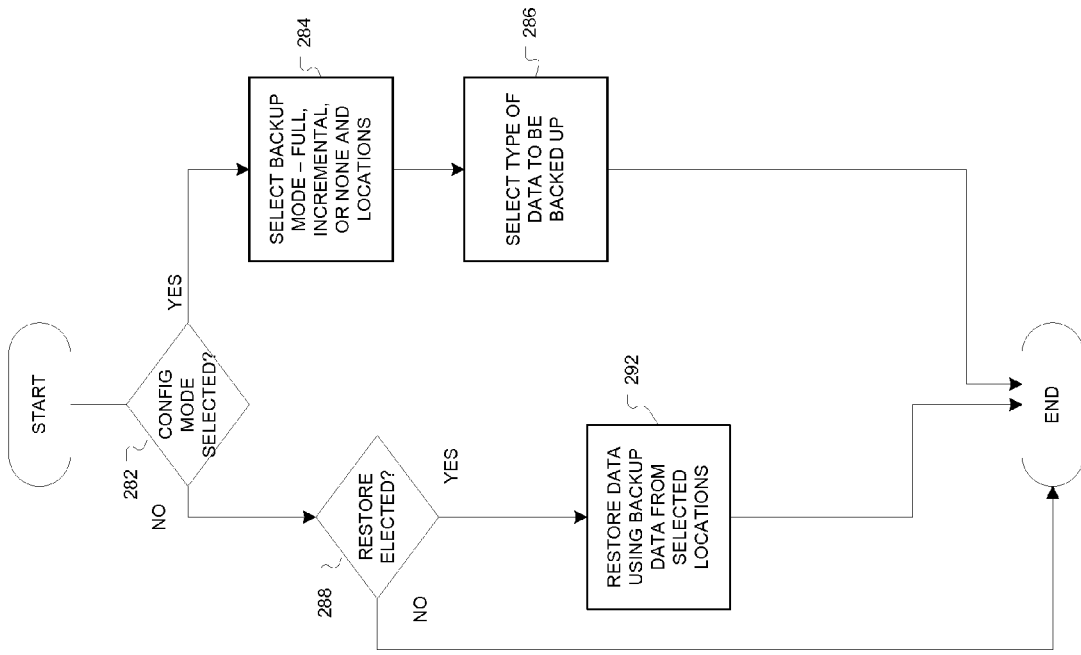
FIGS. 15A and 15B are flow diagrams illustrating several methods according to various embodiments.
Figure 15A:
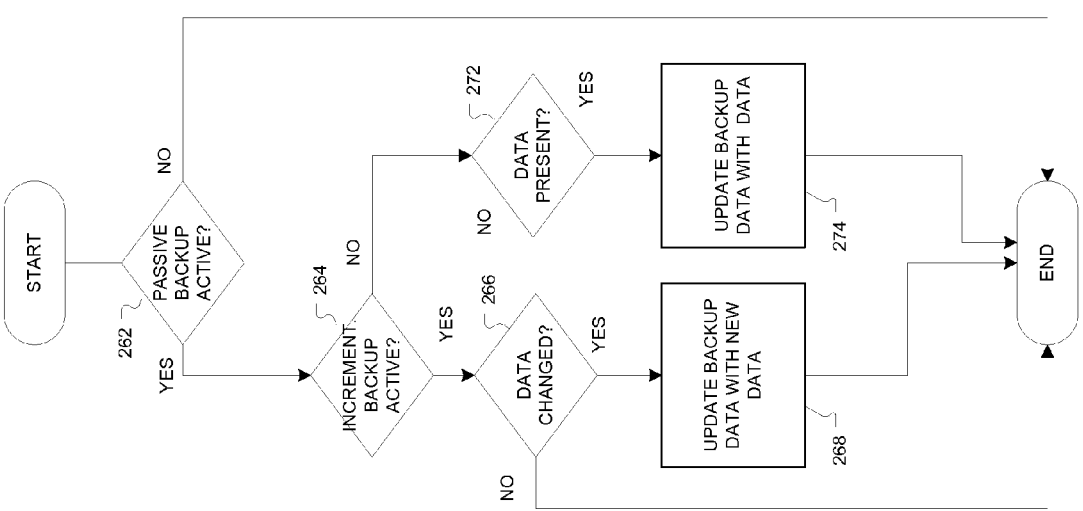

FIG. 15A is a flow diagram illustrating several methods 260 according to various embodiments. An EDPDC apparatus 140A, 140B, 240A, 240B, 350A, 350B, 500A, 500B, 520A, 520B, 650A, 650B, 700, 800, 900A-900C may employ the method 260 illustrated by the FIG. 15A flow diagram to backup data or selectively backup data or data types stored on a device 130, 30, 230, 30A to 30D (such in the device 130, 30, 230, 30A to 30D memory 39). In the backup method 260, when passive backup is active (configured by a user to be active (activity 262)), the method 260 may first determine the type of backup to be performed, incremental or full (activity 264). A user may elect to backup all data for selected data types (full) or only the data for selected data types that has changed since the last backup (incremental backup). When the selected data types such as operating system data, multimedia data (including music, video, and pictures), and business or personal data (such as contracts, calendars, word, spreadsheet, and presentation files) includes changed data and incremental is selected, the method 260 may update backup data with the new or changed data (activity 264, 266, 268).

The backup data may be stored locally on an EDPDC apparatus 140A, 140B, 240A, 240B, 350A, 350B, 500A, 500B, 520A, 520B, 650A, 650B, 700, 800, 900A-900C or on a networked device where the data is communicated from a device 130, 30, 230, 30A to 30D to the networked device via a EDPDC apparatus 140A, 140B, 240A, 240B, 350A, 350B, 500A, 500B, 520A, 520B, 650A, 650B, 700, 800, 900A-900C modem/transceiver 67A. Similarly when a full backup has been configured, the data represented the selected data types may be backed up locally on an EDPDC apparatus 140A, 140B, 240A, 240B, 350A, 350B, 500A, 500B, 520A, 520B, 650A, 650B, 700, 800, 900A-900C or on a networked device where the data is communicated from a device 130, 30, 230, 30A to 30D to the networked device via an EDPDC apparatus 140A, 140B, 240A, 240B, 350A, 350B, 500A, 500B, 520A, 520B, 650A, 650B, 700, 800, 900A-900C modem 67A (activity 272, 274).

FIG. 15B is a flow diagram illustrating several methods 280 according to various embodiments. An EDPDC apparatus 140A, 140B, 240A, 240B, 350A, 350B, 500A, 500B, 520A, 520B, 650A, 650B, 700, 800, 900A-900C may employ the method 280 illustrated by the FIG. 15B flow diagram to enable a user to configure the backup options for data stored on a device 130, 30, 230, 30A to 30D (such in the device 130, 30, 230, 30A to 30D memory 39) or restore data previously backed up to a device. The method 280 may enable a user to configure one or more backup options for an EDPDC apparatus 140A, 140B, 240A, 240B, 350A, 350B, 500A, 500B, 520A, 520B, 650A, 650B, 700, 800, 900A-900C (activity 282, 284). As noted a user may configure various data backup options or to restore data from one or more backups (activity 288).

A user may select the data type(s) to be backed up and the backup mode (full, incremental) (activity 284, 286). A user may also designate multiple backup destinations including networked (via the modem 67A) locations or local on an EDPDC apparatus 140A, 140B, 240A, 240B, 350A, 350B, 500A, 500B, 520A, 520B, 650A, 650B, 700, 800, 900A-900C (activity 284). The method 280 may also enable a user to select the device 30, 130, 230, 30A to 30D data types to be protected or backed up where the data types may include operating system data, multimedia data (including music, video, and pictures), and business or personal data (such as contracts, calendars, word, spreadsheet, and presentation files) (activity 286).

The method 280 may also enable a user to restore data (or selected data) from one or more backups to a device 130, 30, 230, 30A to 30D or other computer device (activity 292). The method 280 may enable data from several locations including local (on an EDPDC apparatus 140A, 140B, 240A, 240B, 350A, 350B, 500A, 500B, 520A, 520B, 650A, 650B, 700, 800, 900A-900C) or networked to be used to restore data on a device 130, 30, 230, 30A to 30D, other coupled device, or to a networked device (activity 292).

Any of the components previously described can be implemented in a number of ways, including embodiments in software. Any of the components previously described can be implemented in a number of ways, including embodiments in software. Thus, the AC/DC coupling 42A, 42B, transformer/inverter 44A, switch controller module 46A, 46B, charging module 48A, 48B, USB interface 52A, 352A, 552A, 52B, 352B, 552B device specific interface 152A, 152B, device specific interface 252A, 252B, ASIC 350A, 350B, 650A, 650B may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments. The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion. A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus for communicating power with an electronic device (ED), the ED including a power interface (PI) including an electrical connector including a plurality of electrical contacts, at least two electrical contacts for communicating power (ECCP), the electrical connector having a mechanical structure, the apparatus including:
   a housing, the housing mechanically separate from the ED, the housing substantially encasing:
      a first power interface (PI) module, the PI module including an electrical connector, the electrical connector including a plurality of electrical contacts, at least two ECCP;
      a second power interface (PI) module, the PI module including an electrical connector and flexible cable, the flexible cable coupled to the electrical connector, a portion of the electrical connector and flexible cable restorably removable from a recess of the housing, the electrical connector including a plurality of electrical contacts, at least two (ECCP), the electrical connector having a mechanical shape configured to mechanically mate with the ED electrical connector and electrically couple the PI module electrical connector at least two ECCP with the ED electric connector at least two ECCP;
      an internal electrical energy storage module (IEESM), the module coupled to the second PI and including an EESE capable of storing electrical energy and discharging electrical energy to provide energy to an ED via the second PI; and
      a charging module coupled to the first PI module and IEESM, the charging module charging the EESE via electrical energy received by the first PI module.

2. The apparatus for communicating power with an ED of claim 1, further including an electrical energy communication module (EECM) operatively coupled to the (IEESM) and the second PI module, the EECM communicating electrical energy between the ED and the apparatus IEESE via the flexible cable and second PI module electrical connector at least two ECCP.

3. The apparatus for communicating power with an ED of claim 1, further including a user perceptible signal generation module, the signal generation module providing an indication of the energy level of the IEESM.

4. The apparatus for communicating power with an ED of claim 1, wherein the first PI module is a direct current module.

5. The apparatus for communicating power with an ED of claim 4, wherein the first PI module includes a universal serial bus interface.

6. The apparatus for communicating power with an ED of claim 1, wherein the first PI module is an alternating current module.

7. The apparatus for communicating power with an ED of claim 6, wherein the first PI module at least two ECCP are extendable from within the housing.

8. The apparatus for communicating power with an ED of claim 2, further including a third PI module, the third PI module including an electrical connector including a plurality of electrical contacts, at least two ECCP, the third PDI module couplable to the IEESM via the EECM.

9. The apparatus for communicating power with an ED of claim 8, the apparatus communicating electrical energy with the ED via the third PI module when operatively coupled to the ED via the third PI.

10. The apparatus for communicating power with an ED of claim 1, wherein the ED includes a power and data interface (PDI) including an electrical connector including a plurality of electrical contacts, at least two electrical contacts for communicating power (ECCP) and at least two, different electrical contacts for communicating data (ECCD), further comprising a data storage module (DSM), and the second PI module enables the communication of data between the DSM and the ED when coupled to the ED.

11. An apparatus for communicating power with an electronic device (ED), the ED including a power interface (PI) including an electrical connector including a plurality of electrical contacts, at least two electrical contacts for communicating power (ECCP), the electrical connector having a mechanical structure, the apparatus including:
   a first power interface (PI) module, the PI module including an electrical connector, the electrical connector including a plurality of electrical contacts, at least two ECCP; and
   a housing, the housing mechanically separate from the ED, the housing substantially encasing:
      a second power interface (PI) module, the PI module including an electrical connector and flexible cable, the flexible cable coupled to the electrical connector, a portion of the electrical connector and flexible cable restorably removable from a recess of the housing, the electrical connector including a plurality of electrical contacts, at least two (ECCP), the electrical connector having a mechanical shape configured to mechanically mate with the ED electrical connector and electrically couple the PI module electrical connector at least two ECCP with the ED electric connector at least two ECCP;
      an internal electrical energy storage module (IEESM), the module coupled to the second PI and including an EESE capable of storing electrical energy and discharging electrical energy to provide energy to an ED via the second PI; and
      a charging module coupled to the first PI module and IEESM, the charging module charging the EESE via electrical energy received by the first PI module.

12. The apparatus for communicating power with an ED of claim 11, further including an electrical energy communication module (EECM) operatively coupled to the (IEESM) and the second PI module, the EECM communicating electrical energy between the ED and the apparatus IEESE via the flexible cable and second PI module electrical connector at least two ECCP.

13. The apparatus for communicating power with an ED of claim 11, further including a user perceptible signal generation module, the signal generation module providing an indication of the energy level of the IEESM.

14. The apparatus for communicating power with an ED of claim 11, wherein the first PI module is a direct current module.

15. The apparatus for communicating power with an ED of claim 14, wherein the first PI module includes a universal serial bus interface.

16. The apparatus for communicating power with an ED of claim 11, wherein the first PI module is an alternating current module.

17. The apparatus for communicating power with an ED of claim 12, further including a third PI module, the third PI module including an electrical connector including a plurality of electrical contacts, at least two ECCP, the third PDI module couplable to the IEESM via the EECM.

18. The apparatus for communicating power with an ED of claim 17, the apparatus communicating electrical energy with the ED via the third PI module when operatively coupled to the ED via the third PI.

19. The apparatus for communicating power with an ED of claim 11, wherein the ED includes a power and data interface (PDI) including an electrical connector including a plurality of electrical contacts, at least two electrical contacts for communicating power (ECCP) and at least two, different electrical contacts for communicating data (ECCD), further comprising a data storage module (DSM), and the second PI module enables the communication of data between the DSM and the ED when coupled to the ED.

20. The apparatus for communicating power with an ED of claim 13, wherein the user perceptible signal generation module includes a light emitting diode.

* * * * *